US010350775B2

(12) United States Patent
Jacobs

(10) Patent No.: US 10,350,775 B2
(45) Date of Patent: *Jul. 16, 2019

(54) SAFETY UTILITY BLADES, ASSEMBLIES AND METHODS OF MANUFACTURING

(71) Applicant: KLEVER KUTTER LLC, Grand Haven, MI (US)

(72) Inventor: Matthew J. Jacobs, Grand Haven, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,807

(22) Filed: Apr. 27, 2018

(65) Prior Publication Data

US 2018/0257250 A1 Sep. 13, 2018

Related U.S. Application Data

(63) Continuation-in-part of application No. 15/014,062, filed on Feb. 3, 2016, now Pat. No. 9,969,091, and a continuation-in-part of application No. 13/866,074, filed on Apr. 19, 2013.

(51) Int. Cl.
| | |
|---|---|
| *B26B 19/02* | (2006.01) |
| *B26B 5/00* | (2006.01) |
| *B26B 9/00* | (2006.01) |
| *B23P 15/28* | (2006.01) |
| *B26B 29/02* | (2006.01) |
| *B23P 15/40* | (2006.01) |

(52) U.S. Cl.
CPC .............. *B26B 29/02* (2013.01); *B23P 15/28* (2013.01); *B23P 15/40* (2013.01); *B26B 5/00* (2013.01); *B26B 9/00* (2013.01)

(58) Field of Classification Search
CPC ... B26B 29/02; B26B 9/00; B26B 5/00; B23P 15/28
See application file for complete search history.

(56) References Cited

U.S. PATENT DOCUMENTS

| | | | | |
|---|---|---|---|---|
| 3,845,554 A * | 11/1974 | Joanis | ....................... | B26B 5/00 30/125 |
| 6,691,416 B2 * | 2/2004 | Yu Chen | ................... | B26B 3/00 30/125 |
| 8,448,544 B2 * | 5/2013 | Howells | ..................... | B26B 9/00 148/567 |
| 8,782,909 B1 * | 7/2014 | Davis | ..................... | B26B 5/003 30/280 |
| 8,914,982 B1 * | 12/2014 | Skluzak | ................... | B26B 5/00 30/337 |
| 9,539,732 B2 * | 1/2017 | Segler | ....................... | B26B 5/00 |
| 9,969,091 B2 * | 5/2018 | Jacobs | ....................... | B26B 5/00 |
| 2005/0278955 A1 * | 12/2005 | Lee | .......................... | B26B 1/02 30/153 |
| 2010/0263219 A1 * | 10/2010 | Kempker | .................. | B25F 1/02 30/337 |
| 2010/0293796 A1 * | 11/2010 | Votolato | ................. | B26B 29/00 30/287 |

(Continued)

Primary Examiner — Hwei-Siu C Payer
(74) Attorney, Agent, or Firm — James E. Shultz, Jr.

(57) ABSTRACT

The present disclosure relates to safety blades for use in utility knives, related assemblies and methods of manufacturing. More specifically, the present disclosure relates to safety blades for use in utility knives, related assemblies and methods of manufacture which limit user exposure to associated cutting edges.

20 Claims, 26 Drawing Sheets

(56) References Cited

U.S. PATENT DOCUMENTS

| | | | | |
|---|---|---|---|---|
| 2012/0180326 A1* | 7/2012 | Wu | ............... | B26B 1/042 30/337 |
| 2013/0298409 A1* | 11/2013 | Jacobs | ............... | B26B 5/00 30/314 |
| 2014/0216605 A1* | 8/2014 | Batty | ............... | B27G 15/00 142/56 |
| 2018/0257250 A1* | 9/2018 | Jacobs | ............... | B23P 15/40 |

* cited by examiner

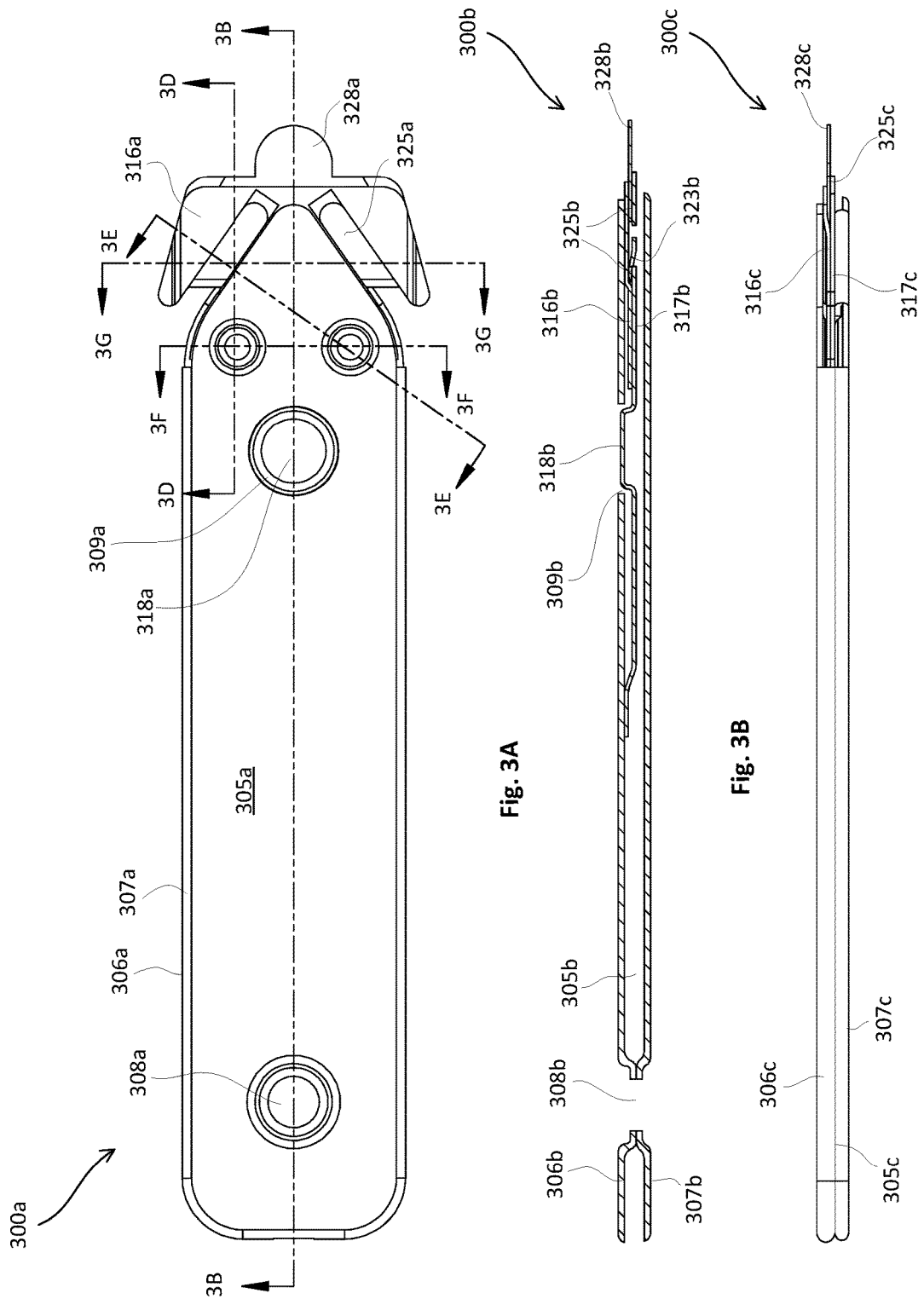

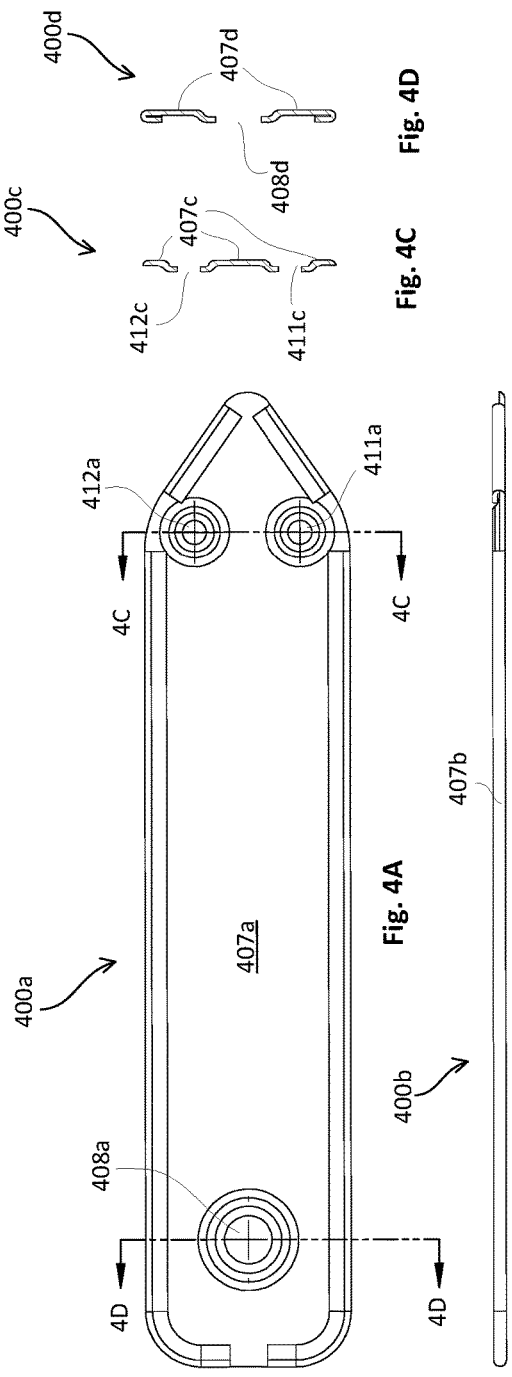
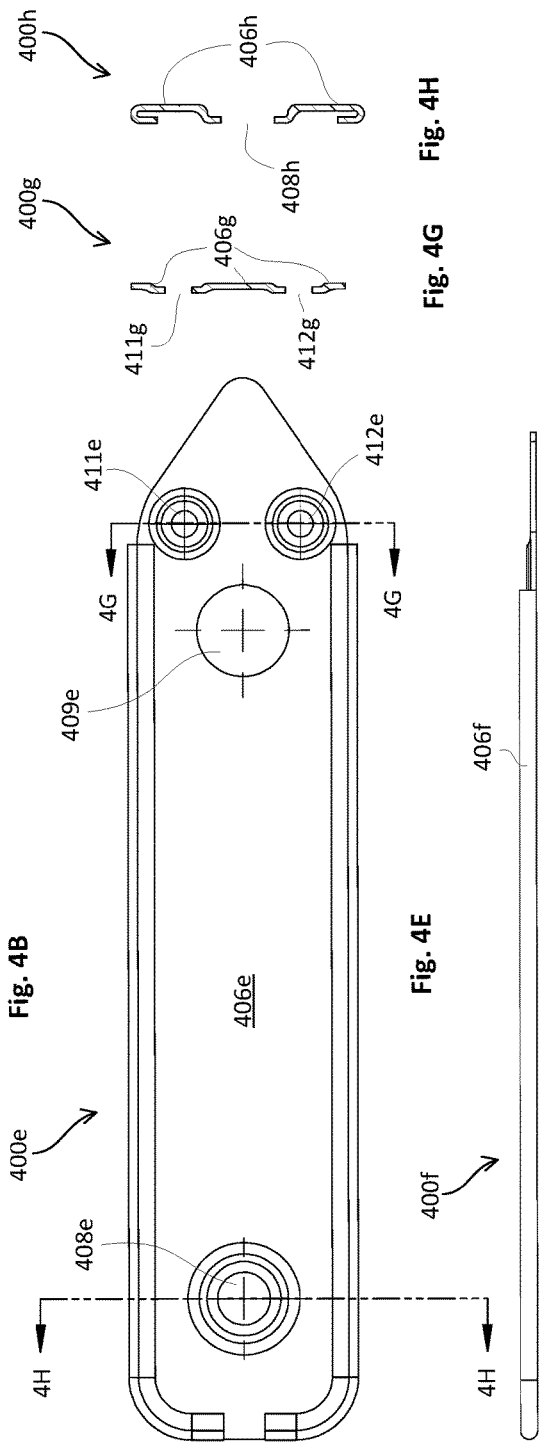

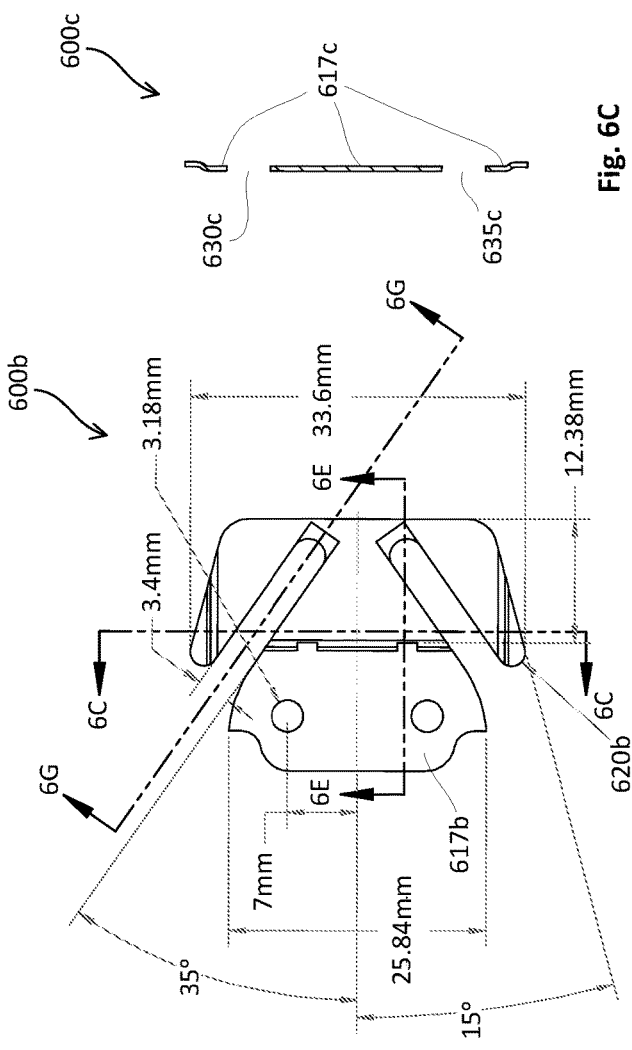

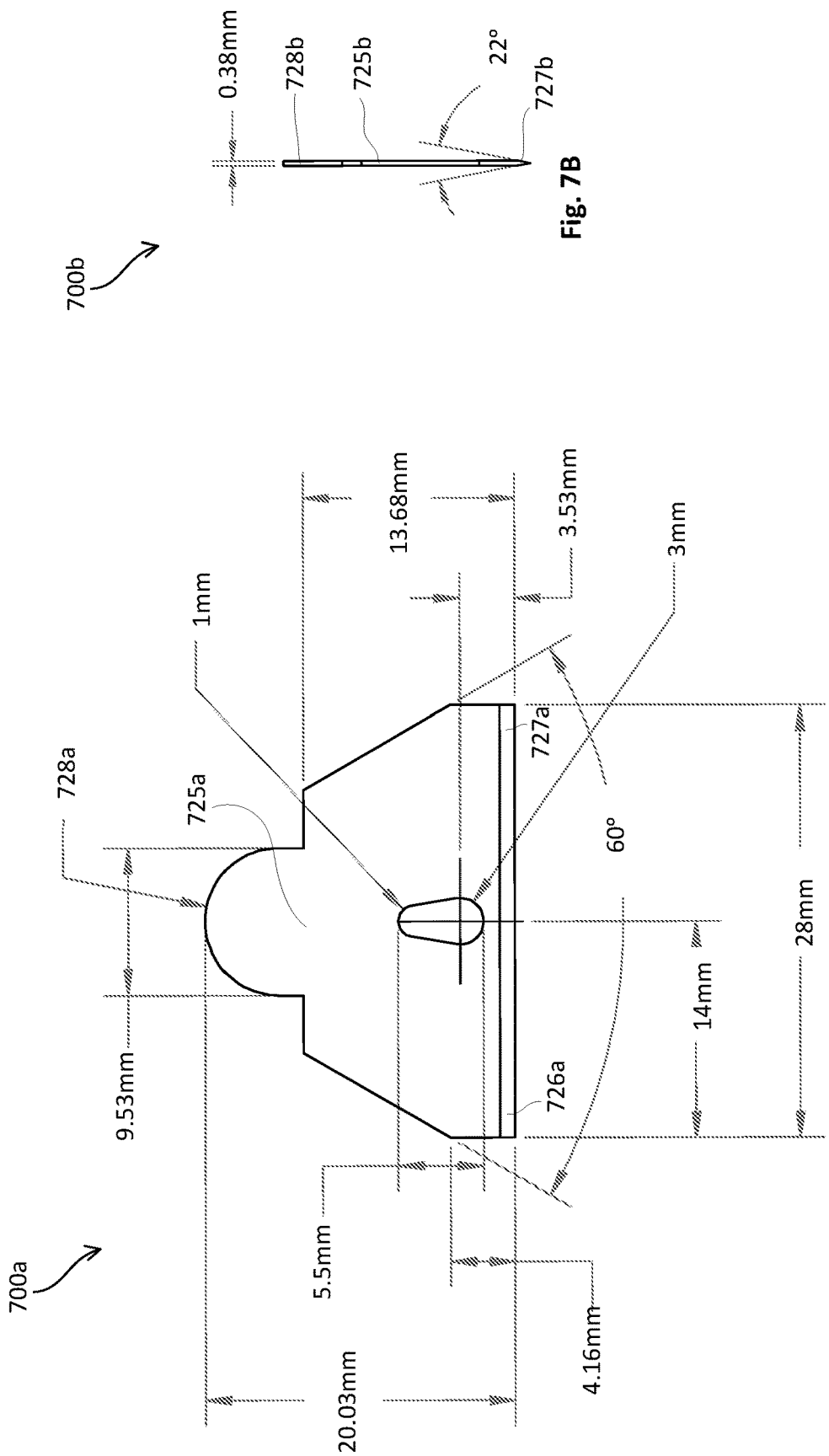

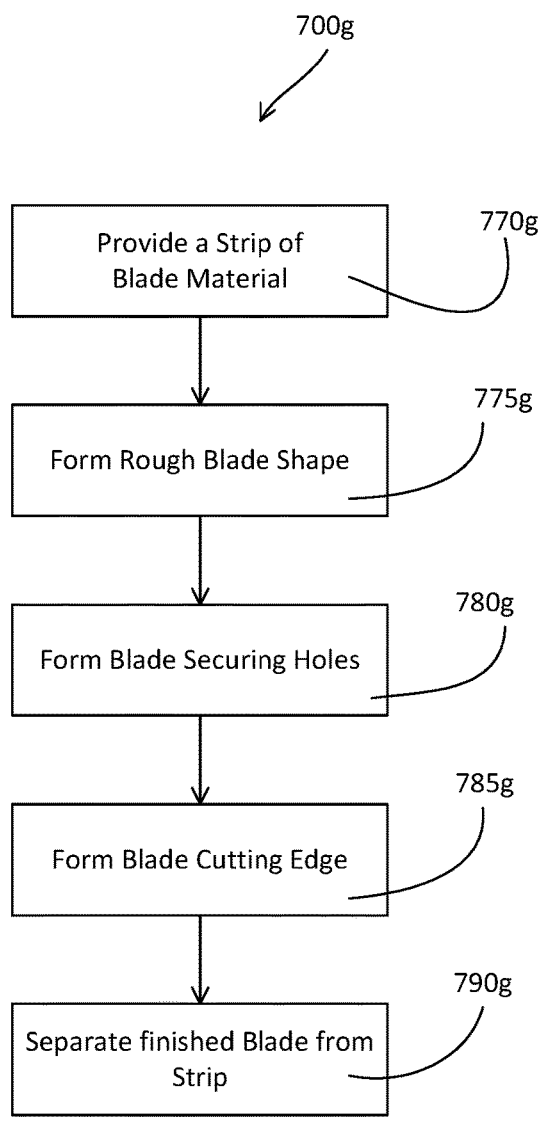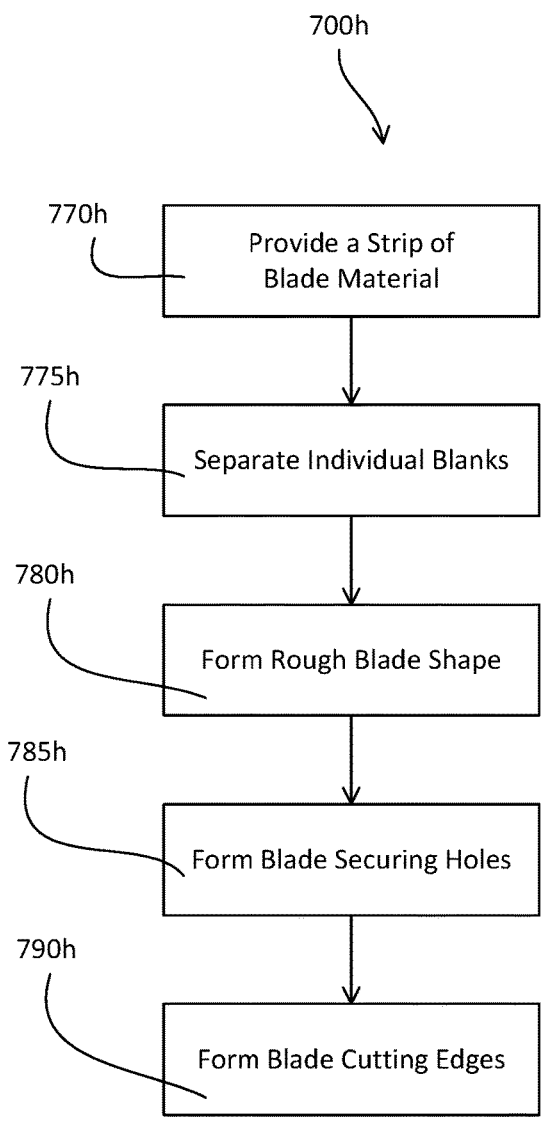
Fig. 7G
Fig. 7H

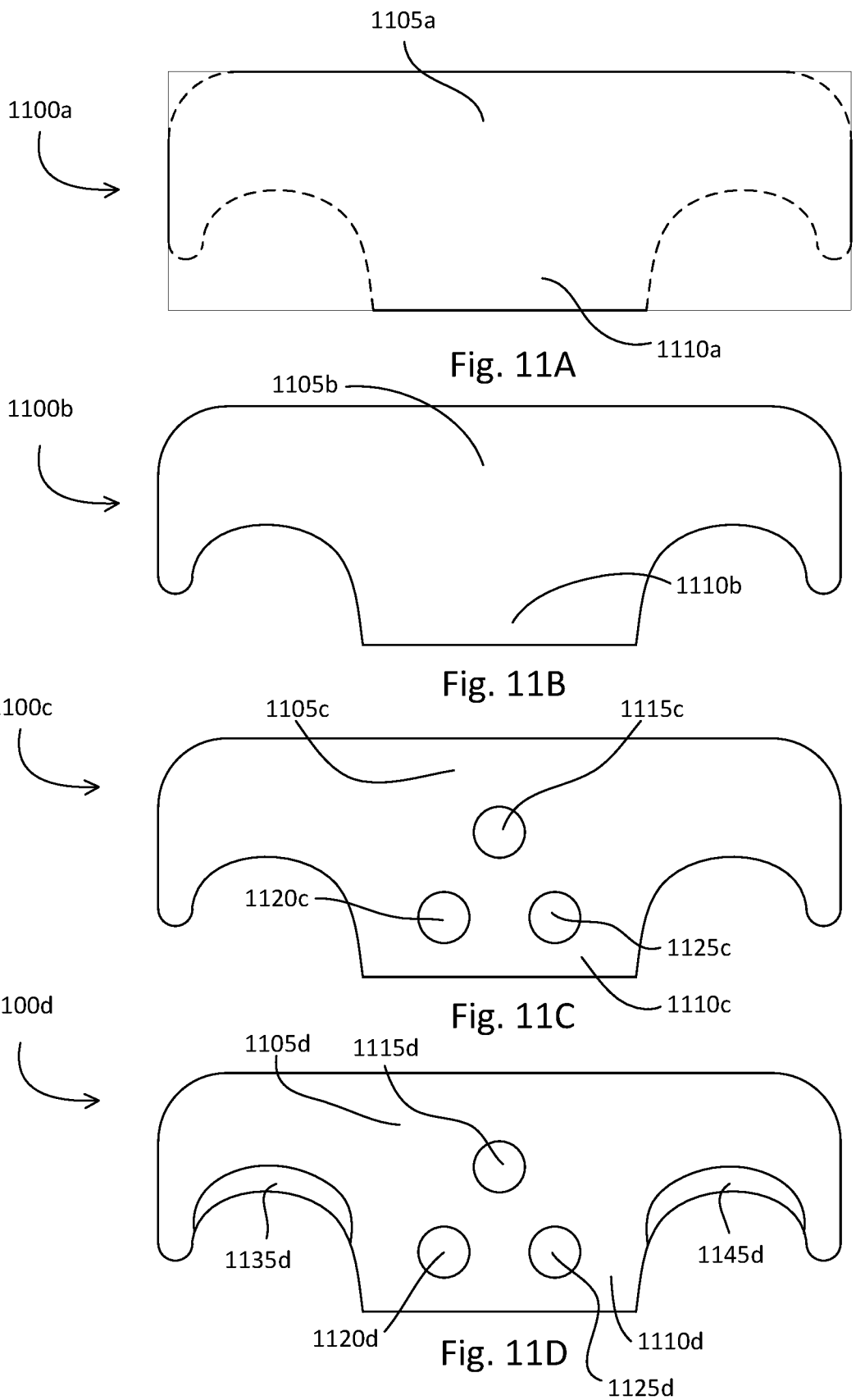

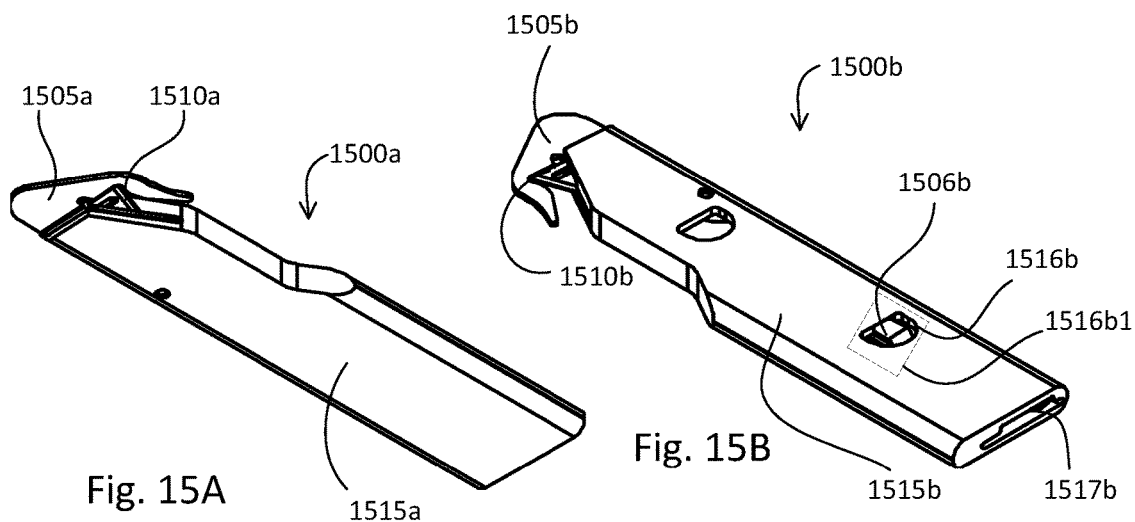
Fig. 15A
Fig. 15B
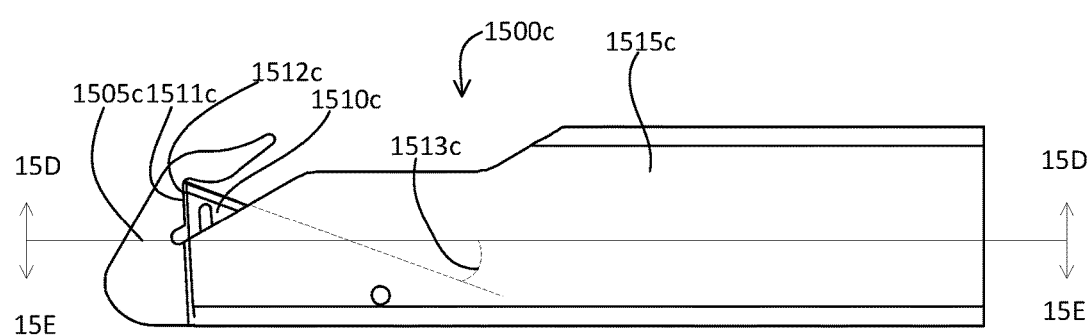
Fig. 15C
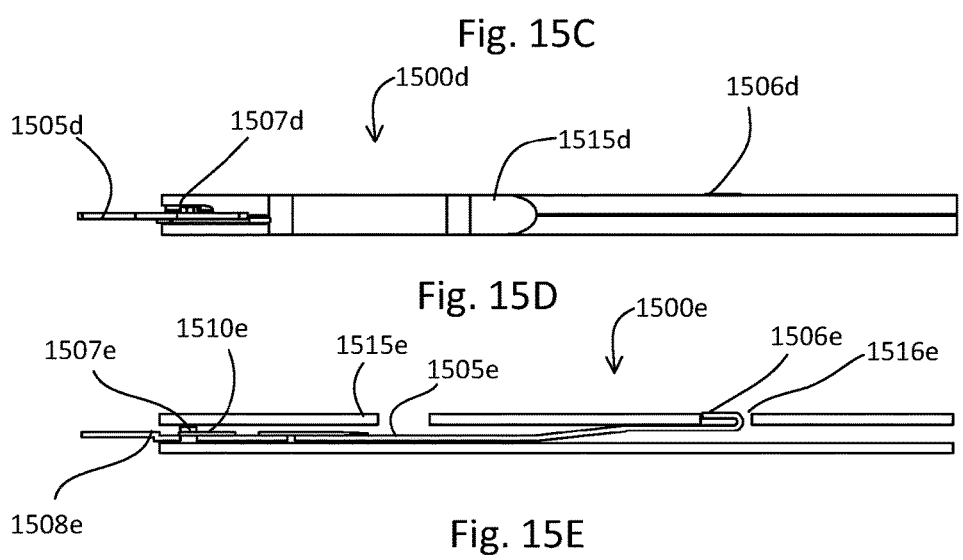
Fig. 15D
Fig. 15E

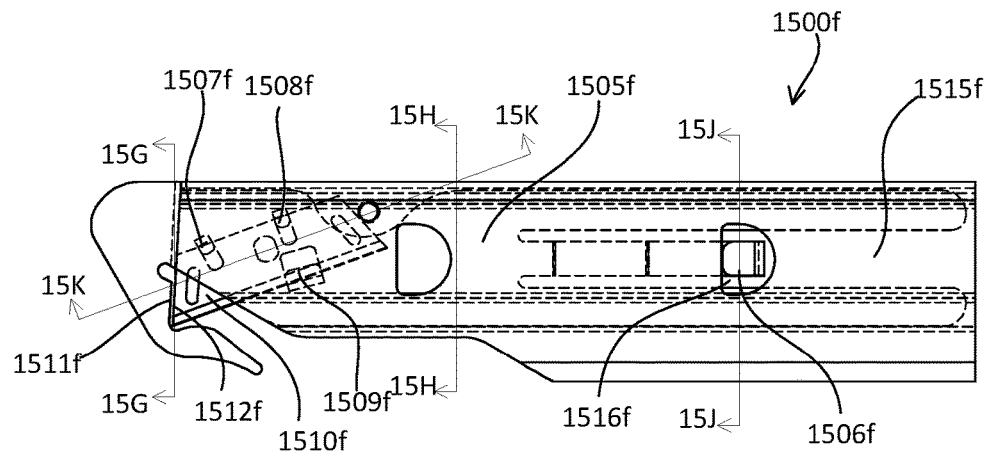
Fig. 15F
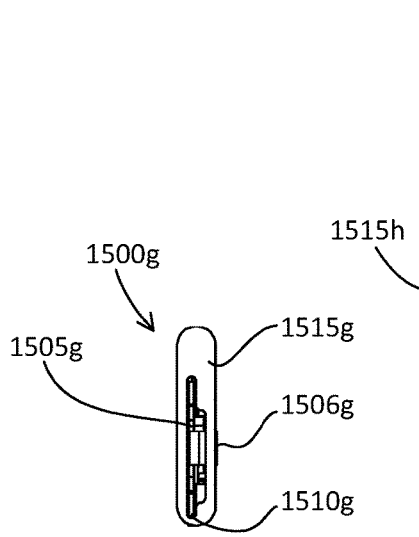
Fig. 15G
Fig. 15H
Fig. 15J
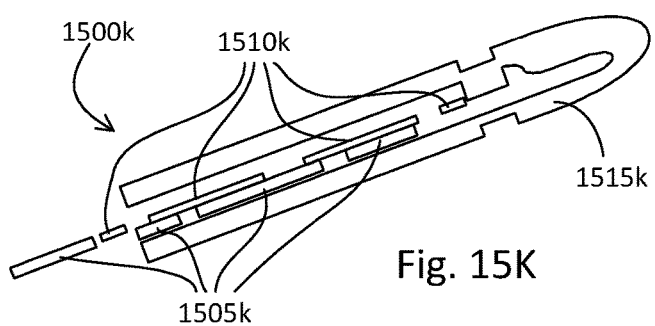
Fig. 15K

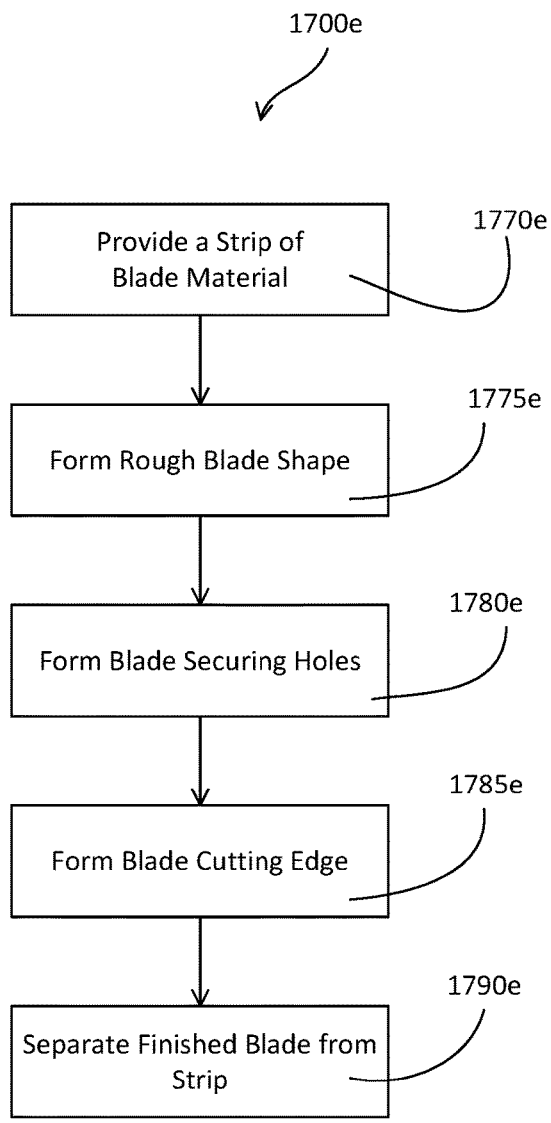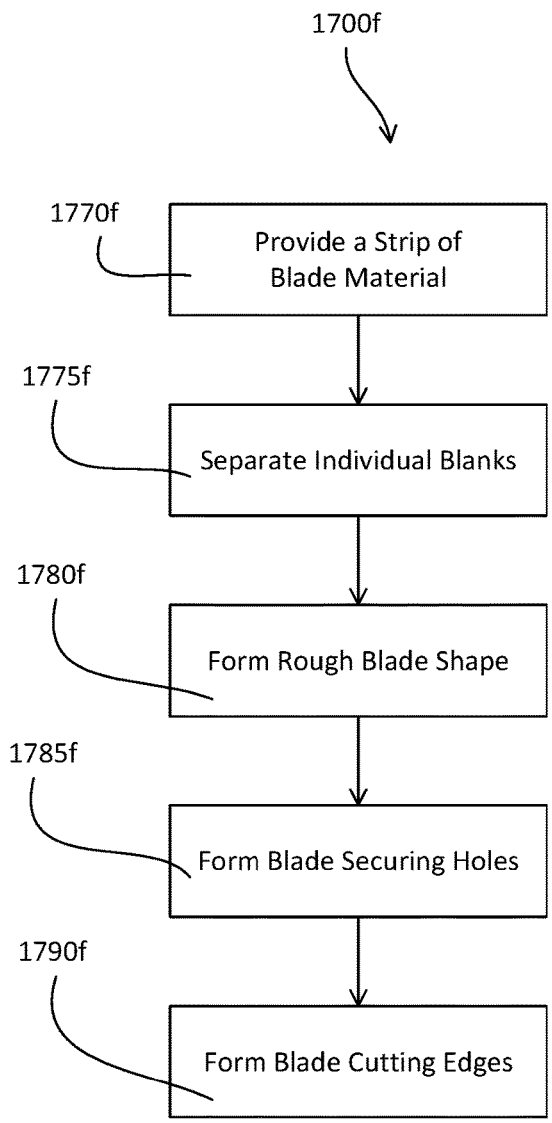
Fig. 17E
Fig. 17F

SAFETY UTILITY BLADES, ASSEMBLIES AND METHODS OF MANUFACTURING

CROSS REFERENCE TO RELATED APPLICATIONS

This application is a continuation-in-part of application Ser. No. 15/014,062, filed Feb. 3, 2016, entitled SAFETY UTILITY BLADES, ASSEMBLIES AND METHODS OF MANUFACTURING (now U.S. Pat. No. 9,969,091), and Ser. No. 13/866,074, filed Apr. 19, 2013, entitled SAFETY UTILITY BLADES, ASSEMBLIES AND METHODS OF MANUFACTURING, the entire contents of each of which are incorporated herein in their entirety.

FIELD OF THE INVENTION

The present disclosure relates to safety blades for use in utility knives, related assemblies and methods of manufacturing. More specifically, the present disclosure relates to safety blades for use in utility knives, related assemblies and methods of manufacture which limit user exposure to associated cutting edges.

BACKGROUND

Utility knives are used for a host of purposes, such as opening cardboard boxes, cutting sheet material, cutting web material, opening packages, etc. Injuries to the users of utility knifes are all too common due to inadvertent contact with cutting edges of associated blades. Injuries may be particularly severe when a given utility knife includes a standard razor blade. Even standard, single edge, razor blades are dangerous.

Inadvertent contact with cutting edges of blades can be equally common during blade removal, insertion and handling. Inadvertent contact with the cutting edges is particularly problematic when a user is removing or inserting a double edge razor blade, or a single edge razor blade without a gripping tab, into an associated utility knife.

Blades for use in utility knives, and utility knives which limit user exposure to the associated cutting edges, are desirable. Methods of manufacturing related blades and utility knives are also desirable.

SUMMARY

A safety utility knife assembly may include a handle having a blade retainer receptacle and a blade retainer having a blade release mechanism and a blade catch, wherein the blade retainer includes a first half and a second half. The safety utility knife assembly further includes a replaceable safety blade having a blade tab and a blade securing aperture. A cutting edge of the replaceable safety blade extends perpendicular to a longitudinally extending axis of the handle. The replaceable safety blade is secured to the safety utility knife when the blade catch is engaged with the blade securing aperture. The replaceable safety blade is removable from the safety utility knife, when a user presses on the blade release mechanism and the blade catch is disengaged from the blade securing aperture.

In another embodiment, a method of manufacturing a replaceable safety blade for use within a safety utility knife assembly may include providing a strip of blade material and forming a rough blade shape from the strip of blade material. The rough blade shape may include a blade tab and a blade securing aperture. The method may further include forming a blade cutting edge in the rough blade shape.

In a further embodiment, a safety utility knife assembly may include a handle and a blade retainer having a blade release mechanism and a blade catch. The safety utility knife may further include a replaceable safety blade having a blade tab and a blade securing aperture. A cutting edge of the replaceable safety blade extends perpendicular to a longitudinally extending axis of the handle. The replaceable safety blade is secured to the safety utility knife when the blade catch is engaged with the blade securing aperture. The replaceable safety blade is removable from the safety utility knife, when a user presses on the blade release mechanism and the blade catch is disengaged from the blade securing aperture.

In yet a further embodiment, a safety utility knife assembly may include a handle having a blade retainer securing aperture and a blade retainer receptacle. The assembly may also include a blade retainer having an upwardly extending blade retainer release button extending outwardly and an upwardly extending blade retainer catch. The blade retainer release button may be received within the aperture and accessible therefrom when the blade retainer is inserted into the handle. The assembly may further include a replaceable safety blade carried by the blade retainer. The replaceable safety blade may be removable from the safety utility knife assembly when a user presses on the blade retainer release button to disengage the blade retainer catch from the blade retainer securing aperture for allowing removal of the blade retainer from the blade retainer receptacle. The blade retainer may further comprises a longitudinally extending resilient arm having one fixed end and an opposing distal end, wherein the blade retainer catch is disposed at the distal end coinciding with the blade retainer release button, wherein the resilient arm flexes at the fixed end. The blade retainer catch may move in the same direction as the blade retainer release button to release the blade retainer and the replaceable safety blade from the handle.

In another embodiment, a method of manufacturing a safety utility knife assembly may include providing a handle having an aperture, and providing a blade retainer having a blade retainer release button extending upwardly and a blade retainer catch. The blade retainer release button may be received within the aperture and is accessible therefrom when the blade retainer is inserted into the handle. The blade retainer catch and the blade retainer release button may be collocated on the blade retainer. The method may also include providing a strip of blade material, forming a rough blade shape from the strip of blade material, forming a blade securing aperture in the rough blade shape, forming a blade cutting edge in the rough blade shape to form a blade, inserting the blade in the blade retainer, inserting the blade retainer into the handle such that the blade retainer catch is received within the blade retainer securing aperture.

In a further embodiment, a safety utility knife assembly may include a handle having an aperture, and a blade retainer having an upwardly extending blade release button extending outwardly and an upwardly extending blade retainer catch. The blade release button may be received within the aperture and accessible therefrom when the blade retainer is inserted into the handle. The assembly may also include a replaceable safety blade carried by the blade retainer. The replaceable safety blade may be removable from the safety utility knife assembly when a user presses on the blade retainer release button to disengage the blade retainer catch from the blade retainer securing aperture for allowing removal of the blade retainer from the blade retainer receptacle. The blade retainer may further comprises a longitudinally extending resilient arm having one fixed end and an opposing distal end. The blade retainer catch may be disposed at the distal end coinciding with the blade retainer release button, wherein the resilient arm flexes at the fixed end. The blade retainer catch may move in the same direction as the blade retainer release button to release the blade retainer and the replaceable safety blade from the handle.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE FIGURES

FIGS. 3A-3H depict various views and detail of the safety utility knife assembly of FIGS. 1 and 2;

FIGS. 4A-4H depict various views and detail of an example handle for use within the safety utility knife assembly of FIGS. 1 and 2;

FIGS. 6A-6G depict various views and detail of an example top half of a blade retainer for use within the safety utility knife assembly of FIGS. 1 and 2;

FIGS. 7A and 7B depict various views and detail of an example safety blade for use within the safety utility knife assembly of FIGS. 1 and 2;

FIGS. 7C-7H depict example manufacturing methods for fabrication of the safety blade of FIGS. 7A and 7B;

FIGS. 11A-11D depict a second example progression of manufacturing the safety utility blade of FIGS. 8A, 8B and 9;

FIGS. 15A-15H and 15J-15K depict an example safety utility knife assembly;

FIG. 17E depicts an example flow diagram for a method of manufacturing the safety blade of FIG. 17A;

FIG. 17F depicts an example flow diagram for a method of manufacturing the safety blade of FIGS. 17B-17D.

DETAILED DESCRIPTION

The safety utility blades and safety utility knife assemblies of the present disclosure may incorporate various features that limit user exposure to associated cutting edges. The manufacturing methods of the present disclosure may be used to produce the disclosed safety utility blades and safety utility knife assemblies.

Figure 1:
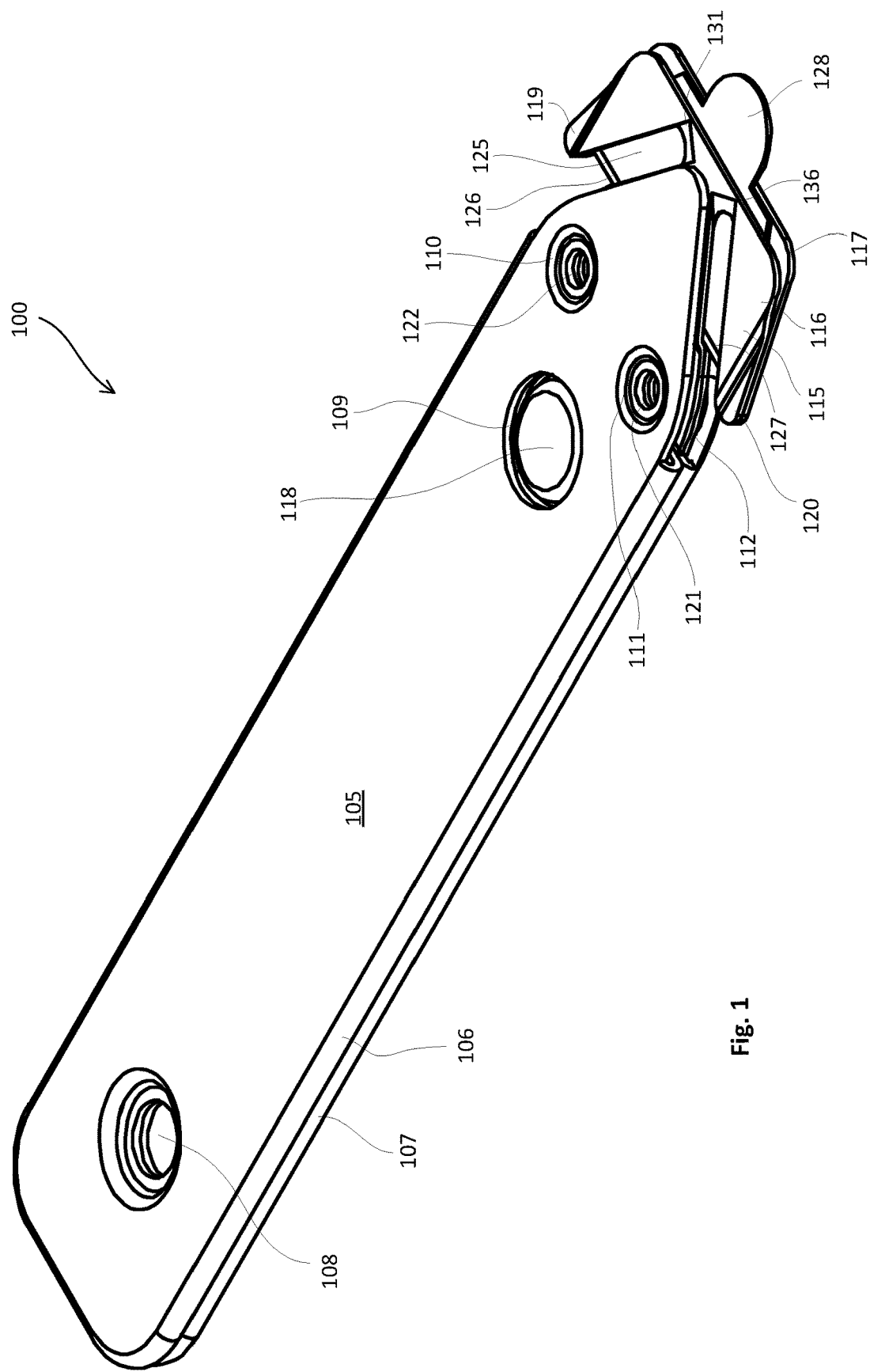
FIGS. 1 and 2 depict an example safety utility knife assembly.

With initial reference to FIG. 1, a safety utility knife assembly 100 may include a replaceable safety blade 125. As described in detail herein, the replaceable safety blade 125 may be inserted into a blade retainer 115 which, in turn, may be inserted into a blade retainer receptacle 112 of an associated handle 105. The safety utility knife 100 may include a blade release button 118. The replaceable safety blade 125 may include a blade tab 128. A user may remove the replaceable safety blade 125 from the safety utility knife assembly 100 by, for example, grasping the blade tab 128, pressing the button 118, and pulling the replaceable safety blade 125 from the blade retainer 115.

The handle 105 may include a first half 106 secured to a second half 107 forming, for example, the blade retainer receptacle 112 in one end for receiving a blade retainer 115. The handle 105 may include an aperture 108 for hanging the safety utility knife assembly 100 on, for example, a peg or hanger of some sort. Alternatively, or additionally, the safety utility knife assembly 100 may be secured to a clip of, for example, a lanyard, a strap, a key chain, etc. (not shown). The handle 105 may include blade retainer receptacles 110, 111 configured to receive, for example, blade retainer snaps 121, 122, respectively. The blade retainer 115 may include a first half 116 and a second half 117. The first half 116 of the blade retainer 115 may include a first blade end offset 119, a second blade end offset 120, a first wedge 131, and a second wedge 136. The first wedge 131 and the second wedge 135 may be configured to, for example, prevent, or minimize, material buildup. The safety utility blade 125 may include a first cutting edge 126 and a second cutting edge 127. Alternatively, the first and second cutting edges 126, 127 of a safety utility blade 125 may define a single, continuous, cutting edge. Further details of the handle 105, the blade retainer 115, and the replaceable safety blade 125 are described throughout this disclosure.

Advantageously, when either of the first or second cutting edge 126, 127 becomes dull, or worn, a user may simply flip the safety utility knife assembly 100 over and use the other cutting edge 126, 127. When both the first cutting edge 126 and the second cutting edge 127 are dull, or worn, a user may simply replace the replaceable safety blade 125 while reusing other components (e.g., handle 105 and safety utility blade retainer 115) of the safety utility knife assembly 100.

Figure 2:
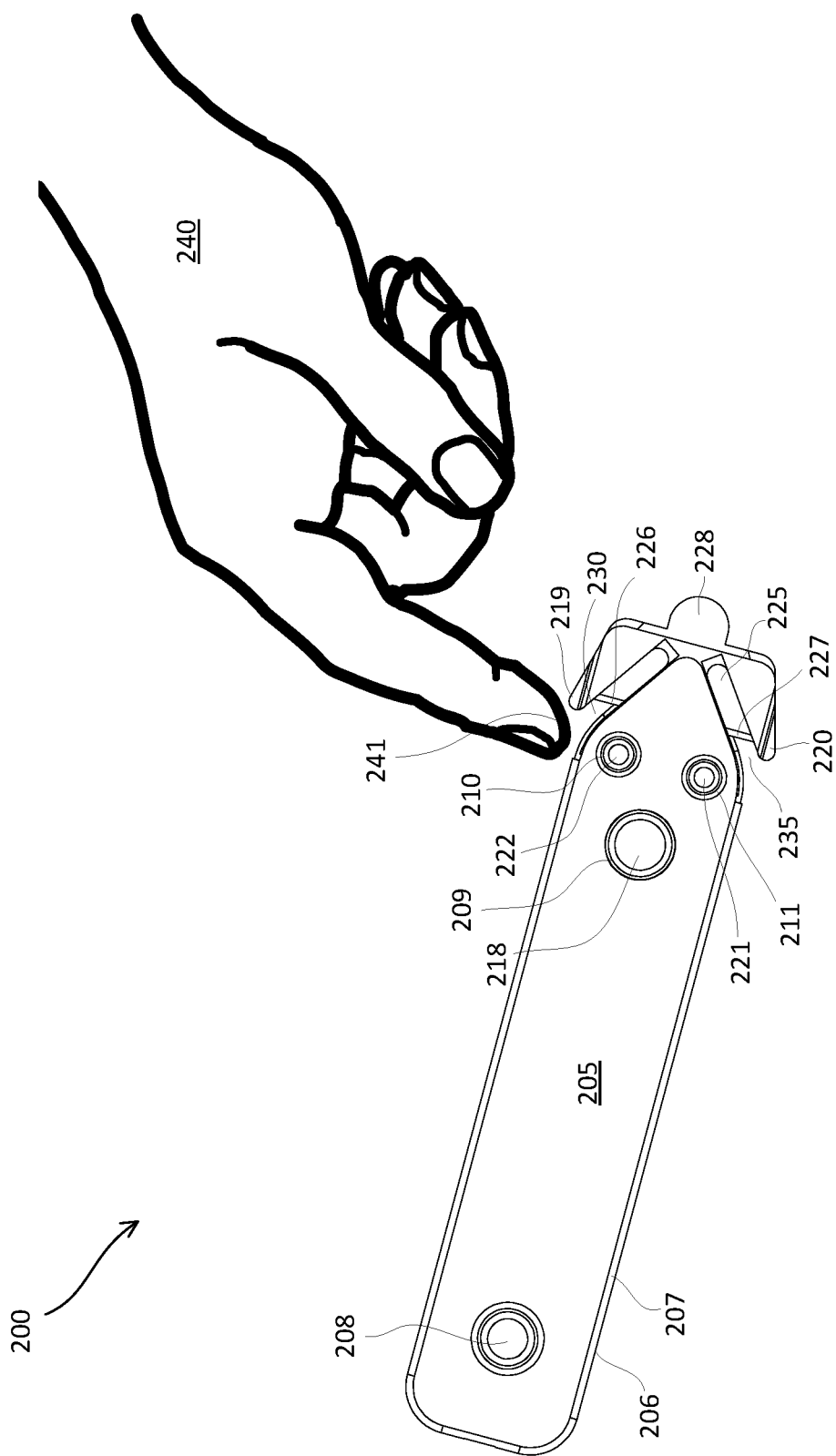

Turning to FIG. 2, a safety utility knife assembly 200 may include a first blade throat 230 defined by a first blade retainer tip 219 and a proximate portion of a blade handle 205. The safety utility knife assembly 200 may be similar to, for example, the safety utility knife 100 of FIG. 1. In any event, the safety utility knife assembly 200 may include a second blade throat 235 defined by a second blade retainer tip 220 and a proximate portion of a blade handle 205. The first blade throat 230 may be configured to, for example, limit access of a finger 241 of a hand 240 of a user to a first cutting edge 226 of an associated blade 225. Similarly, the second blade throat 235 may be configured to limit exposure to a second cutting edge 227.

The safety utility knife assembly 200 may include a blade release button 218. The replaceable safety blade 225 may include a blade tab 228. A user may remove the replaceable safety blade 225 from the safety utility knife assembly 200 by, for example, grasping the blade tab 228, pressing the button 218, and pulling the replaceable safety blade 225 from the blade handle 205. The handle 205 may include a first half 206 secured to a second half 207 for receiving a replaceable safety blade 225. The handle 205 may include an aperture 208 for hanging the safety utility knife assembly 200 on, for example, a peg or hanger of some sort. Alternatively, or additionally, the safety utility knife assembly 200 may be secured to a clip of, for example, a lanyard, a strap, a keychain, etc. (not shown). The handle 205 may include blade retainer receptacles 210, 211 configured to receive, for example, blade retainer snaps 221, 222, respectively. Further details of the handle 205 and the replaceable safety blade 225 are described throughout this disclosure.

Figure 3F:
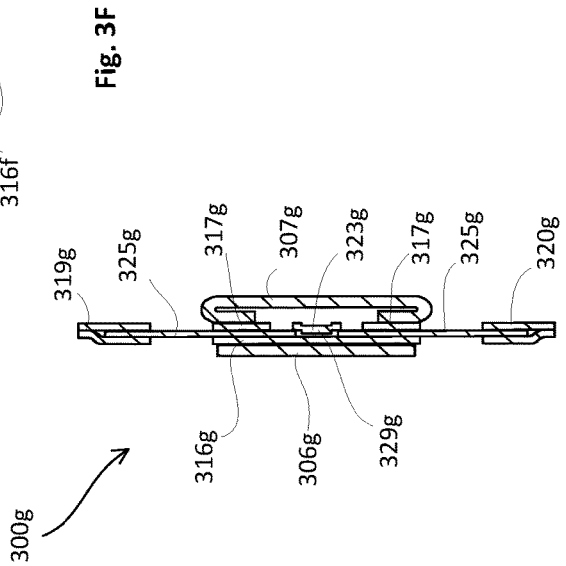
Figure 3G:
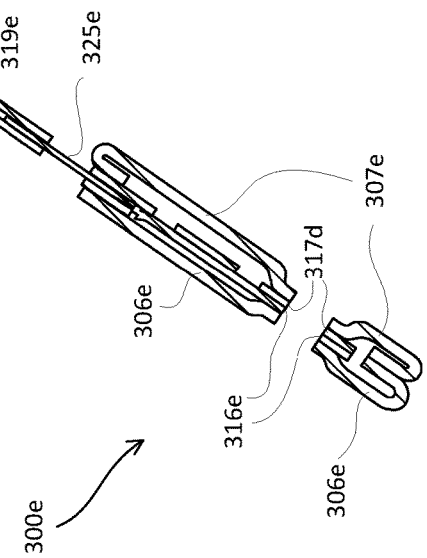
Figure 3D:
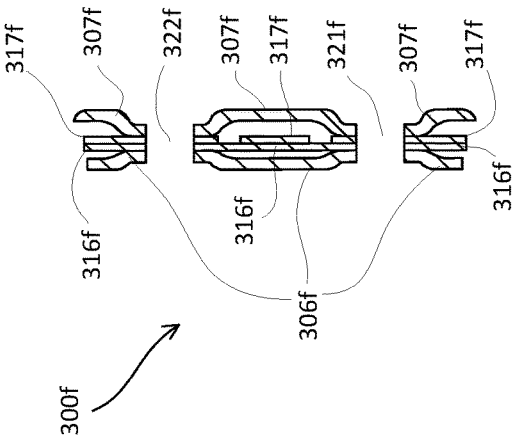
Figure 3E:
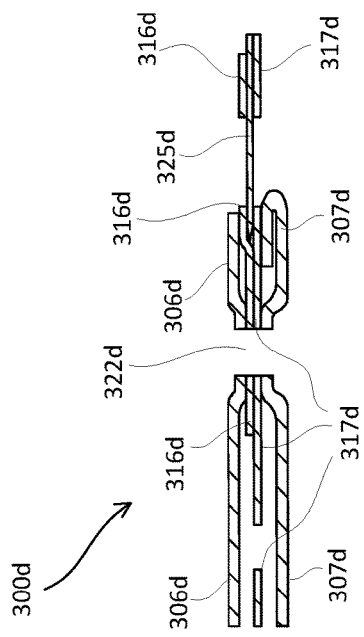

With reference to FIGS. 3A-3H, a safety utility knife assembly 300a-h, may include a replaceable safety blade 325a-e, 325g, 325h retained by a handle 305a-c. The safety utility knife assembly 300a-h may be similar to, for example, either the safety utility knife assembly 100 of FIG. 1 or the safety utility knife assembly 200 of FIG. 2. The cross-section view of the safety utility knife 300b of FIG. 3B is taken along the section-line 3B-3B of FIG. 3A. The cross-section view of the safety utility knife 300d of FIG. 3D is taken along the section-line 3D-3D of FIG. 3A. The cross-section view of the safety utility knife 300e of FIG. 3E is taken along the section-line 3E-3E of FIG. 3A. The cross-section view of the safety utility knife 300f of FIG. 3F is taken along the section-line 3F-3F of FIG. 3A. The cross-section view of the safety utility knife 300g of FIG. 3G is taken along the section-line 3G-3G of FIG. 3A.

The handle 305a-c may include a first half 306a-h secured to a second half 307a-h, a first aperture 308a, 308h, a second blade retainer release button aperture 309a, 309b, 309h, a third aperture 311h, and a fourth aperture 311h. The safety utility knife assembly 300a-h may include a first blade retainer half 316a-h having a first wedge 331h and a second wedge 336h, and a second blade retainer half 317a-h having a blade retainer release button 318a, 318b, a blade retention catch 323g, 323h, a first blade retainer pin 321f, 321h, and a second blade retainer pin 322f, 322h. The replaceable safety blade 325a-e, 325g, 325h may include a blade tab 328a-c, 328h and a blade retainer securing aperture 329g, 329h. The replaceable safety blade 325a-e, 325g, 325h may be retained within the safety utility knife assembly 300a-h when the blade retention catch 323g, 323h is received within the blade retainer securing aperture 329g, 329h. The safety utility knife assembly 300a-h may include a first blade throat 330h configured to, for example, limit access to a first cutting edge 326h. Similarly, the safety utility knife assembly 300a-h may include a second blade throat 335h configured to limit exposure to a second cutting edge 327h.

Turning to FIGS. 4A-4H, a handle 400a-h for use within a safety utility knife assembly (e.g., safety utility knife assembly 100 of FIG. 1, safety utility knife assembly 200 of FIG. 2, or safety utility knife assembly 300a-h of FIGS. 3A-3H) may include a first half 406e-h and a second half 407a-d. The first half 406e-h may be similar to, for example, the first half 106 of FIG. 1 or the first half 206 of FIG. 2. The second half 407a-d may be similar to, for example the second half 107 of FIG. 1 or the second half 207 of FIG. 2. The cross-section view of the first half 406h of FIG. 4H is taken along the section-line 4H-4H of FIG. 4E. The cross-section view of the first half 406g of FIG. 4G is taken along the section-line 4G-4G of FIG. 4E. The cross-section view of the second half 407c of FIG. 4C is taken along the section-line 4C-4C of FIG. 4A. The cross-section view of the second half 407e of FIG. 4E is taken along the section-line 4E-4E of FIG. 4A. The first half 406e-h may include a first aperture 408e, 408h, a second blade retainer release button aperture 409e, a third aperture 411e, 411g, and a fourth aperture 412e, 412h. The second half 407a-d may include a first aperture 408a, 408g, a second aperture 411a, 411c, and a third aperture 412a, 412c.

Figure 5D:
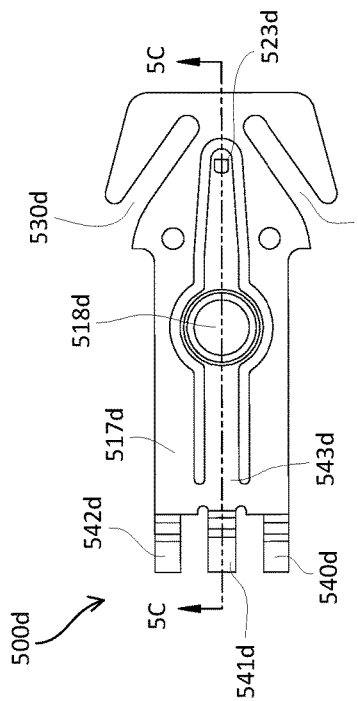
FIGS. 5A-5G depict various views and detail of an example bottom half of a blade retainer for use within the safety utility knife assembly of FIGS. 1 and 2.
Figure 5E:
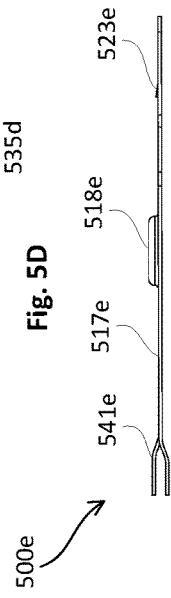
Figure 5F:
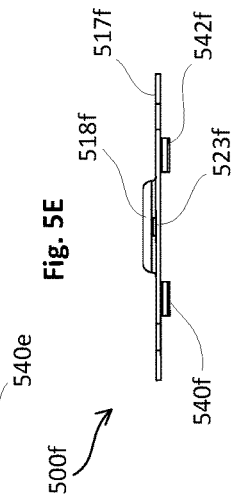
Figure 5G:
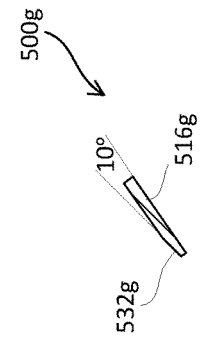
Figure 5A:
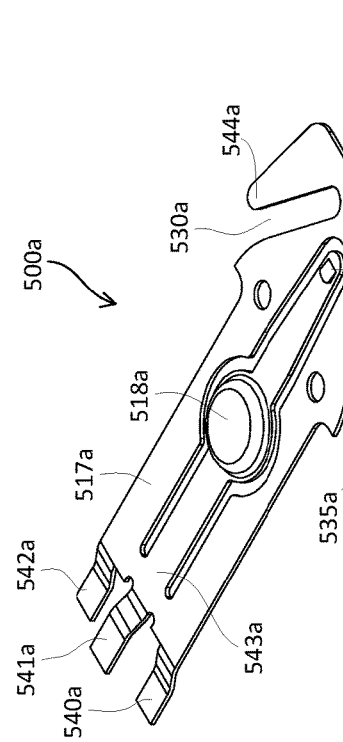
Figure 5B:
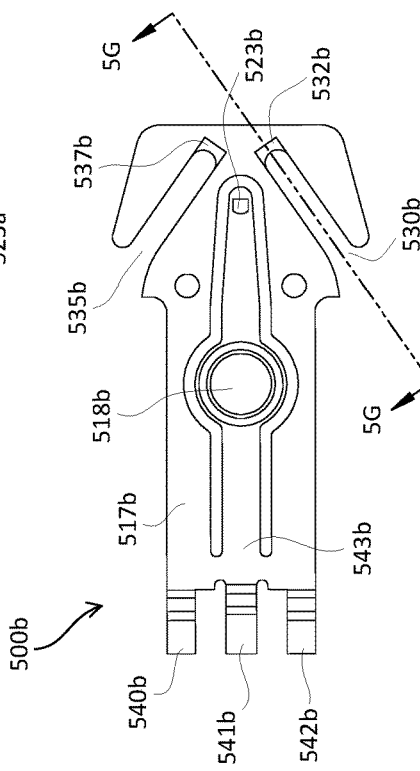
Figure 5C:
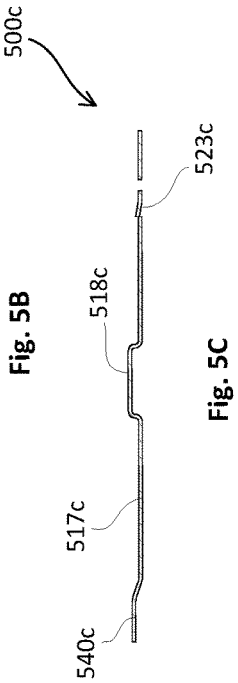

With reference to FIGS. 5A-5G, first half 500a-g of a blade retainer (e.g., blade retainer 115 of FIG. 1) for use within the safety utility knife (e.g., safety utility knife assembly 100 of FIG. 1, safety utility knife assembly 200 of FIG. 2, or safety utility knife assembly 300a-h of FIGS. 3A-3H). The first half 500a-g may be similar to, for example, the first half 116 of FIG. 1, the first half 216 of FIG. 2, or the first half 316a-h of FIGS. 3A-3H. The cross-section view of the first half 500g of FIG. 5G is taken along the section-line 5G-5G of FIG. 5B. The cross-section view of the first half 500c of FIG. 5C is taken along the section-line 5C-5C of FIG. 5D.

Figure 3H:
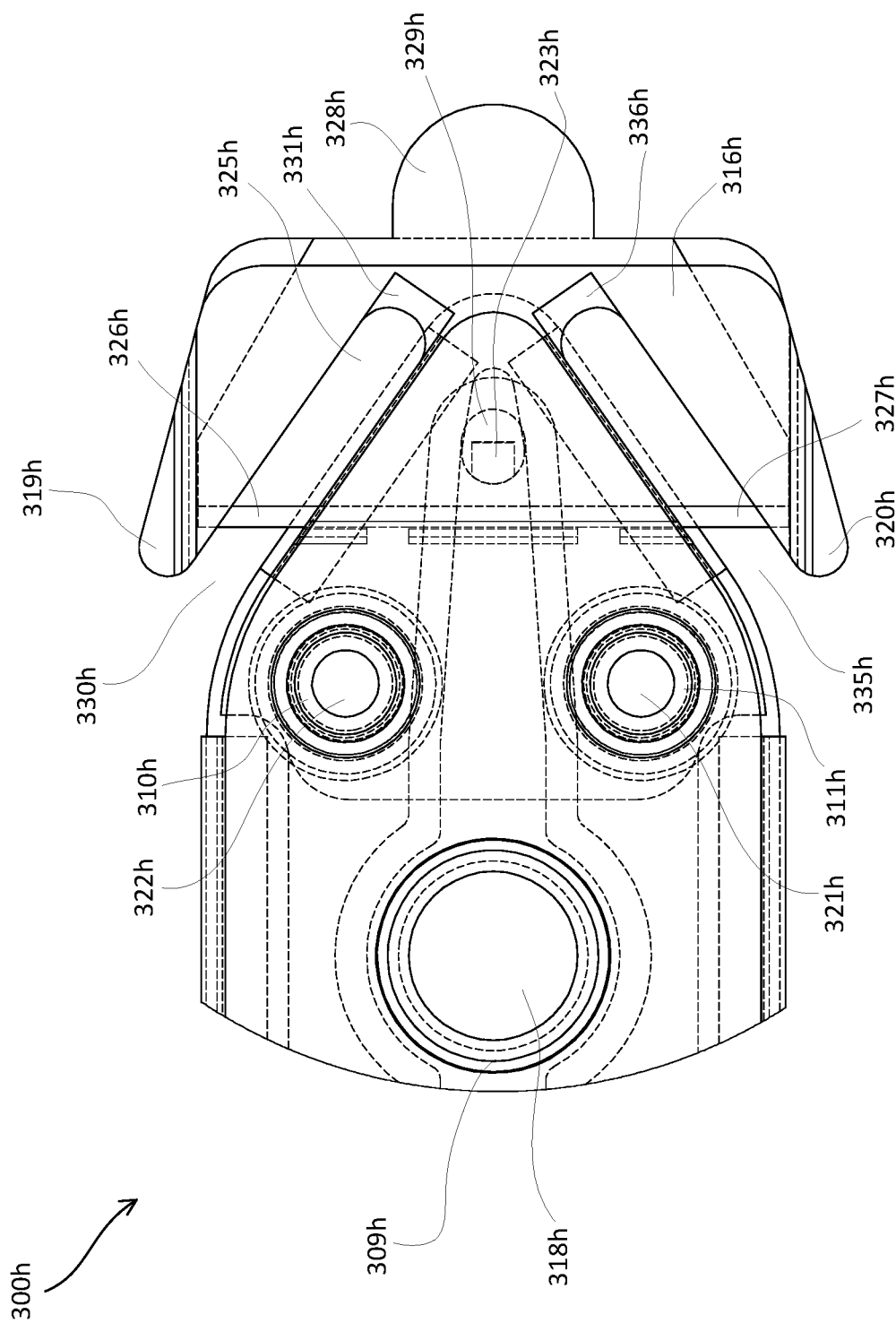

The first half 500a-g may include a first blade throat 530a, 530b, 530e configured to, for example, limit access to a first cutting edge (e.g., first cutting edge 126 of FIG. 1, first cutting edge 226, or first cutting edge 326h of FIG. 3H). Similarly, the first half 500a-g may include a second blade throat 535a, 535b, 535e configured to, for example, limit access to a second cutting edge (e.g., first cutting edge 127 of FIG. 1, second cutting edge 226, or second cutting edge 326h of FIG. 3H). The first half 500a-g may include a blade retainer release button 518a-f and a blade retainer retention catch 523a-f pivotally attached via a flex 543a-b, 543d. The first half 500a-g may include a first spacer/retainer 540a-f, a second spacer/retainer 541a-e, and a third spacer/retainer 542a-d, 542f. The first spacer/retainer 540a-f, the second spacer/retainer 541a-e, and the third spacer/retainer 542a-d, 542f may be configured to secure the first half 500a-g within an associated safety utility knife assembly (e.g., safety utility knife assembly 100 of FIG. 1, safety utility knife assembly 200 of FIG. 2, or safety utility knife assembly 300a-h of FIGS. 3A-3H).

The first half 500a-g may include a first wedge 532b, 532g and a second wedge 537b. As illustrated in FIG. 5G, the first wedge 532h, 532g may define a ten degree angle with respect to a surface 516f of the first half 500a-g. More generally, the first wedge 532h, 532g may define between a five and fifteen degree angle with respect to a surface 516f of the first half 500a-g. The second wedge 537b may be, for example, similar to the first wedge 532b, 532g.

As illustrated by the dashed line in FIG. 5A, the first half 500a-g, may include a finger/thumb blade access 524a configured to allow use of a safety blade (not shown in FIGS. 5A-5G), that, for example, does not include a blade tab (e.g., blade tab 128 of FIG. 1). In such an embodiment, a user may remove an associated replaceable safety blade by grasping a portion of the replaceable safety blade within the finger/thumb blade access 524a. Thus, an associated safety utility knife assembly (e.g., safety utility knife assembly 100 of FIG. 1, safety utility knife assembly 200 of FIG. 2, or safety utility knife assembly 300a-h of FIGS. 3A-3H) may include any readily available replaceable blade having a blade securing hole (e.g., blade securing hole 746c3 of FIG. 7C).

Turning to FIGS. 6A-6G, a second half 600a-g of a blade retainer (e.g., blade retainer 115 of FIG. 1) for use within the safety utility knife (e.g., safety utility knife assembly 100 of FIG. 1, safety utility knife assembly 200 of FIG. 2, or safety utility knife assembly 300a-h of FIGS. 3A-3H). The second half 600a-g may include a body 617a-g, a first blade throat 630a, 630c, and a second blade throat 635a, 635c. The second half 600a-g may include dimensions as shown in FIG. 6B, however, any the second half 600a-g may include any other suitable dimensions as long as an associated first half and an associated safety blade are provided with corresponding dimensions.

The second half 600a-g may include a first wedge 633a-b, 633e, 633g and a second wedge 638a-b. As illustrated in FIG. 6G, the first wedge 633a-b, 633e, 633g may define a ten degree angle with respect to a body 617g of the first half 600a-g. More generally, the first wedge 633a-b, 633e, 633g may define between a five and fifteen degree angle with respect to a surface 617g of the first half 600a-g. The second wedge 638a-b may be, for example, similar to the first wedge 633a-b, 633e, 633g.

As illustrated by the dashed line 624a in FIG. 6A, the second half 600a-g, may include a finger/thumb blade access 624a configured to allow use of a safety blade (not shown in FIGS. 6A-6G), that, for example, does not include a blade tab (e.g., blade tab 128 of FIG. 1). In such an embodiment, a user may remove an associated replaceable safety blade by grasping a portion of the replaceable safety blade within the finger/thumb blade access 624a. Thus, an associated safety utility knife assembly (e.g., safety utility knife assembly 100 of FIG. 1, safety utility knife assembly 200 of FIG. 2, or safety utility knife assembly 300a-h of FIGS. 3A-3H) may include any readily available replaceable blade having a blade securing hole (e.g., blade securing hole 746c3 of FIG. 7C).

With reference to FIGS. 7A and 7B, a safety blade 700a, 700b for use within the safety utility knife (e.g., safety utility knife assembly 100 of FIG. 1, safety utility knife assembly 200 of FIG. 2, or safety utility knife assembly 300a-h of FIGS. 3A-3H) may include a first cutting edge 726a, a second cutting edge 727a, 727b, and a blade tab 728a, 728b. The first cutting edge 726a and the second cutting edge 727a, 727b may define a single, continuous cutting edge. The safety blade 700a, 700b may be similar to, for example, the safety blade 125, 225 of FIGS. 1 and 2, respectively. In lieu of the safety blade 700a, 700b, a blade in accordance with any of the blades described and mentioned in commonly assigned U.S. patent application Ser. No. 13/866,074, along with an associated blade retainer, may be used with the handle 400a-400h and 400j of FIGS. 4A-4H and 4J, respectively. The safety blade 725a, 725b may include dimensions as shown in FIGS. 7A and 7B or, alternatively, may include any suitable dimensions provided associated a blade retainer are provided with corresponding dimensions.

Figure 7C:
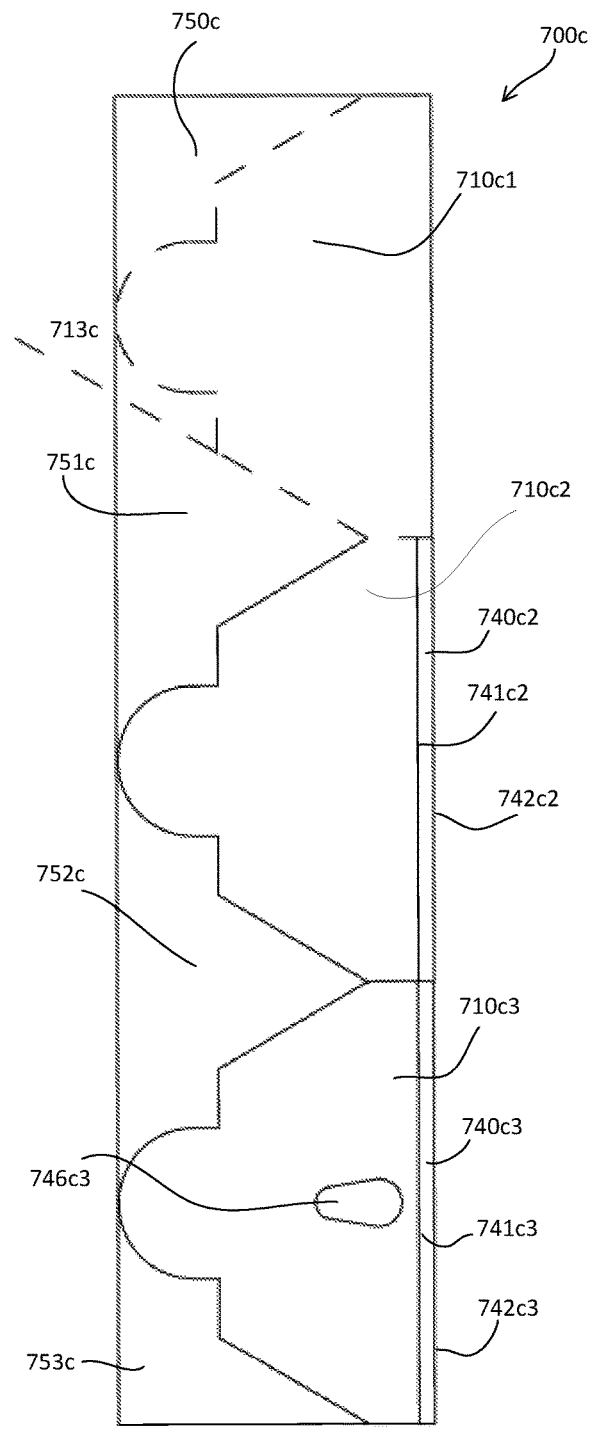
Figure 7D:
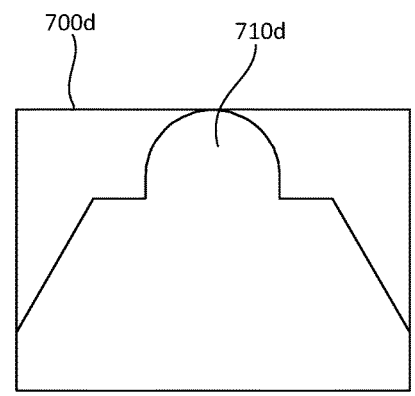
Figure 7E:
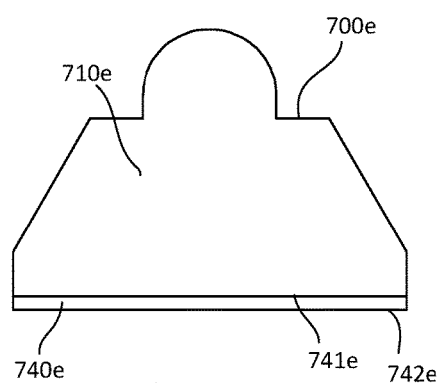
Figure 7F:
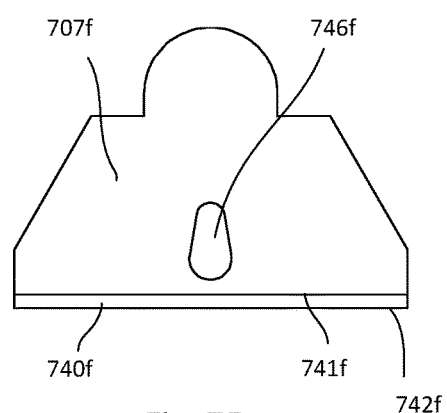

Turning to FIGS. 7C and 7H, a manufacturing method for fabrication of the replaceable safety blade of FIGS. 7A and 7B for use in a safety utility knife assembly (e.g., safety utility knife assembly 100 of FIG. 1, safety utility knife assembly 200 of FIG. 2, or safety utility knife assembly 300a-h of FIGS. 3A-3H) may include providing a strip of blade material 700c (block 770g). A rough blade shape 710c1 may be formed by removing material 750a (block 775g). A blade securing hole 746c3 may be formed in the rough blade shape 710c1 by any suitable method, such as laser cutting, water jet cutting, machining, drilling, stamp shearing, etc. (block 780g). A sharpened portion 740c2, 740c3 may be formed by any suitable method, such as those disclosed in U.S. Pat. Nos. 4,265,055, 5,842,387, 6,860,796 or 8,206,199, for example (block 785g). The sharpened portion 740c2, 740c3 may define a shoulder 741c2, 741c3 and a cutting edge 742c2, 742c3. The blade 710c3 may be separated from the strip of blade material 700c by removing material 752c, 753c (block 790g). A blade end 751c may form an angle 713c with respect to a linear edge of the strip of blade material 700c of approximately 60°. Alternatively, the angle 713c may be between approximately 55° and approximately 70°.

With reference now to FIGS. 7D-7F and 7H, a method 700h of manufacturing a blade 710a, 710b for use in a safety utility knife assembly (e.g., safety utility knife assembly 100 of FIG. 1, safety utility knife assembly 200 of FIG. 2, or safety utility knife assembly 300a-h of FIGS. 3A-3H) may include blade blanks 700d that may be formed from a strip of blade material 700c (block 775h). Rough blade shapes 710d may be formed from the blade blanks 700d (block 780h). A blade securing hole 746f may be formed in the rough blade shape 700d by any suitable method, such as laser cutting, water jet cutting, machining, drilling, stamp shearing, etc. (block 785h). A sharpened portion 740e, 740f may be formed on a blade blank 710e, 710f by any suitable method, such as those disclosed in U.S. Pat. Nos. 4,265,055, 5,842,387, 6,860,796 or 8,206,199, for example (block 790h). The sharpened portion 740e, 740f may define a shoulder 741e, 741f and a cutting edge 742e, 742f.

A safety utility knife assembly (e.g., safety utility knife assembly 100 of FIG. 1, safety utility knife assembly 200 of FIG. 2, or safety utility knife assembly 300a-h of FIGS. 3A-3H) for use in, for example, a food industry may include a handle (e.g., handle 105 of FIG. 1), a replaceable safety blade retainer (e.g., replaceable safety blade retainer 115 of FIG. 1), and a replaceable safety blade (e.g., replaceable safety blade 125 of FIG. 1) that are each made from, for example, metal such that any portion of, or all of, the safety utility knife assembly 100 that is, for example, dropped into a batch of associated food may be detected and/or removed via associated metal detection/removal equipment.

A safety utility knife assembly (e.g., safety utility knife assembly 100 of FIG. 1, safety utility knife assembly 200 of FIG. 2, or safety utility knife assembly 300a-h of FIGS. 3A-3H) may include various features as described, for example, in commonly assigned U.S. patent application Ser. No. 12/620,999, which was filed on Nov. 18, 2009, and U.S. patent application Ser. No. 13/866,074, which was filed on Apr. 19, 2013, the disclosures of which are incorporated in their entireties herein by reference thereto.

Figure 8A:
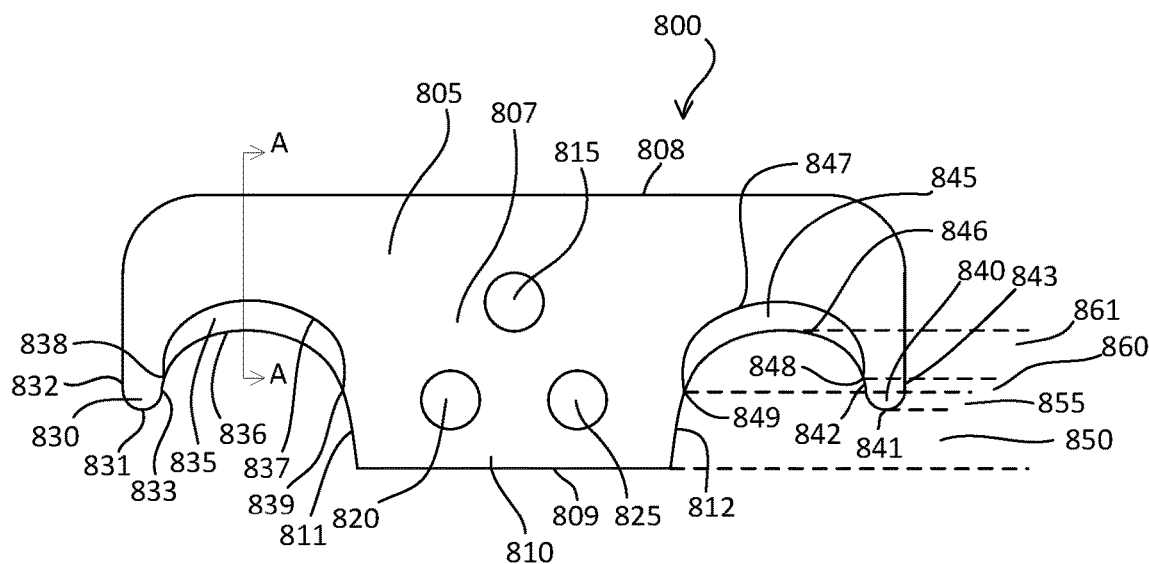
FIGS. 8A and 8B depict an example safety utility blade for use within a utility knife assembly.
Figure 8B:
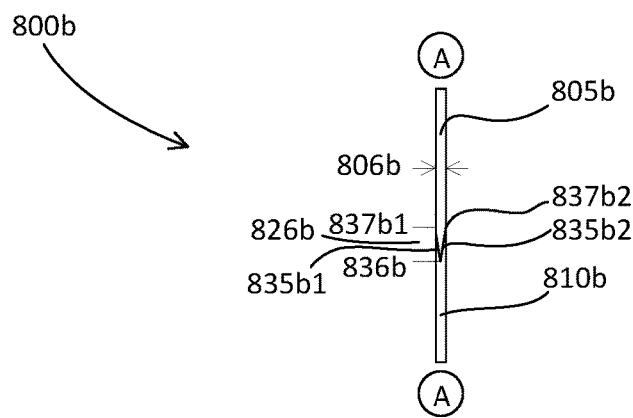

With initial reference to FIGS. 8A and 8B, a safety utility blade 800 may have a body 805 formed from a relatively thin and substantially flat material 807, such as ceramic, heat treated carbon steel, ceramic coated steel, stainless steel, Teflon coated material, etc. For example, the material 807 may be approximately 0.025 inches thick 806b. A blade blank (e.g. blade blank 1000a, 1100a, 1700a, 1700b of FIGS. 10A, 11A, 17A and 17B, respectively) may be 1.0964567 inches from a first end 832 to a second end 842 and 0.3917323 inches from a top side 808 to a bottom side 809. The safety utility blade may include blade securing holes 815, 820, 825 which may be approximately 0.0984252 inches in diameter. As described herein the blade securing holes 815, 820, 825 may, at least in part, secure a safety utility blade 800 to a safety utility knife cutting head (e.g., safety utility knife cutting head 1200a of FIG. 12A or 1200b of FIG. 12B). The safety utility blade 800 may be formed from a suitable material 807 for retaining a sharpened edge 836, 837, and, when that material 807 is metal, the body 805 preferably has a thickness 806b of at least 0.0156 inches and preferably not greater than about 0.0313 inches. What might be characterized as a "heavy-duty" safety utility blade 800 is approximately 0.025 inches thick, and the thickness 806b for what might be characterized as a "regular duty" safety utility blade 800 is approximately 0.017 inches. The sharpened portion 135, 145 is approximately 0.0492 inches high. A center of the first blade securing hole 815 may be approximately 0.23622 inches from the bottom side 809 and approximately 0.54825 inches from the first end 832. A center of the second blade securing hole 820 may be approximately 0.07874 inches from the bottom side 809 and approximately 0.449825 inches from the first end 832. A center of the third blade securing hole 825 may be approximately 0.07874 inches from the bottom side 809 and approximately 0.449825 inches from the second end 842. The sharpened portion 835, 845 may be coated with a material, such as paint, that may wear away as the associated safety utility blade 800 is being used to indicate whether the safety utility blade 800 has been used. The consistency of the material, such as paint, may be selected such that the amount of wear of the material is indicative of the amount of use of and/or the sharpness of the safety utility blade 800.

With further reference to FIGS. 8A and 8B, the safety utility blade 800 may include a body portion 805, 805b and a blade attachment portion 810, 810b. The first sharpened portion 835 of the safety utility blade 800 may include a first shoulder 837, a first cutting edge 836, a first heal 839 and a first toe 838. The blade attachment portion 810, 810b may include a first edge 811 extending from the first heal 839 to the bottom side 809. The safety utility blade 800 may further include a first blade shield 830 having a first blunt tip 831 having a radius approximately 0.03937 inches and a thickness that is greater than the first sharpened portion 835 and less than or equal to the thickness 806b of the body 805. The first blade shield 830 may include a first inner edge 833 that extends from the first toe 839 to the first blunt tip 831 and may have a thickness that is greater than the first sharpened portion 835 and less than or equal to the thickness 806b of the body 805, 805b. A first distance 826b between the first shoulder 837 and the first cutting edge 836 may be approximately 0.04921 inches.

With further reference to FIGS. 8A and 8B, the safety utility blade 800 may include a second sharpened portion 845 which may include a second shoulder 847, a second cutting edge 846, a second heal 849 and a second toe 848. The blade attachment portion 810, 810b may include a second edge 812 extending from the second heal 849 to the bottom side 809. The safety utility blade 800 may further include a second blade shield 840 having a second blunt tip 841 having a radius approximately 0.03937 inches and a thickness that is greater than the second sharpened portion 845 and less than or equal to the thickness 806b of the body 805. The second blade shield 840 may include a second inner edge 843 that extends from the second toe 849 to the second blunt tip 841 and may have a thickness that is greater than the second sharpened portion 845 and less than or equal to the thickness 806b of the body 805. A second distance 850 between the bottom side 809 and the second blunt tip 841 may be approximately 0.05315 inches. A third distance 855 between the bottom side 809 and the second heal 849 may be approximately 0.0687 inches. A fourth distance 860 between the bottom side 809 and the second toe 848 may be approximately 0.0774 inches. A fifth distance 861 between the bottom side 809 and the second cutting edge 846 may be approximately 0.1496 inches. As depicted in FIG. 8B, the cutting edge 836b may be defined by a third sharpened portion 835b1 extending from a third shoulder 837b1 and a fourth sharpened portion 835b2 extending from a fourth shoulder 837b2. It should be understood that either of the cutting edges 836, 846 may be formed similar to cutting edge 836b. The sharpened portion 835, 845, the third sharpened portion 835b1 and/or the fourth sharpened portion 835b2 may be substantially concave or convex shaped. Alternatively, a portion of the sharpened portion 835, 845, a portion of the third sharpened portion 835b1 and/or a portion of the fourth sharpened portion 835b2 may be substantially concave or convex shaped with the remainder defining a linear shape.

Figure 9:
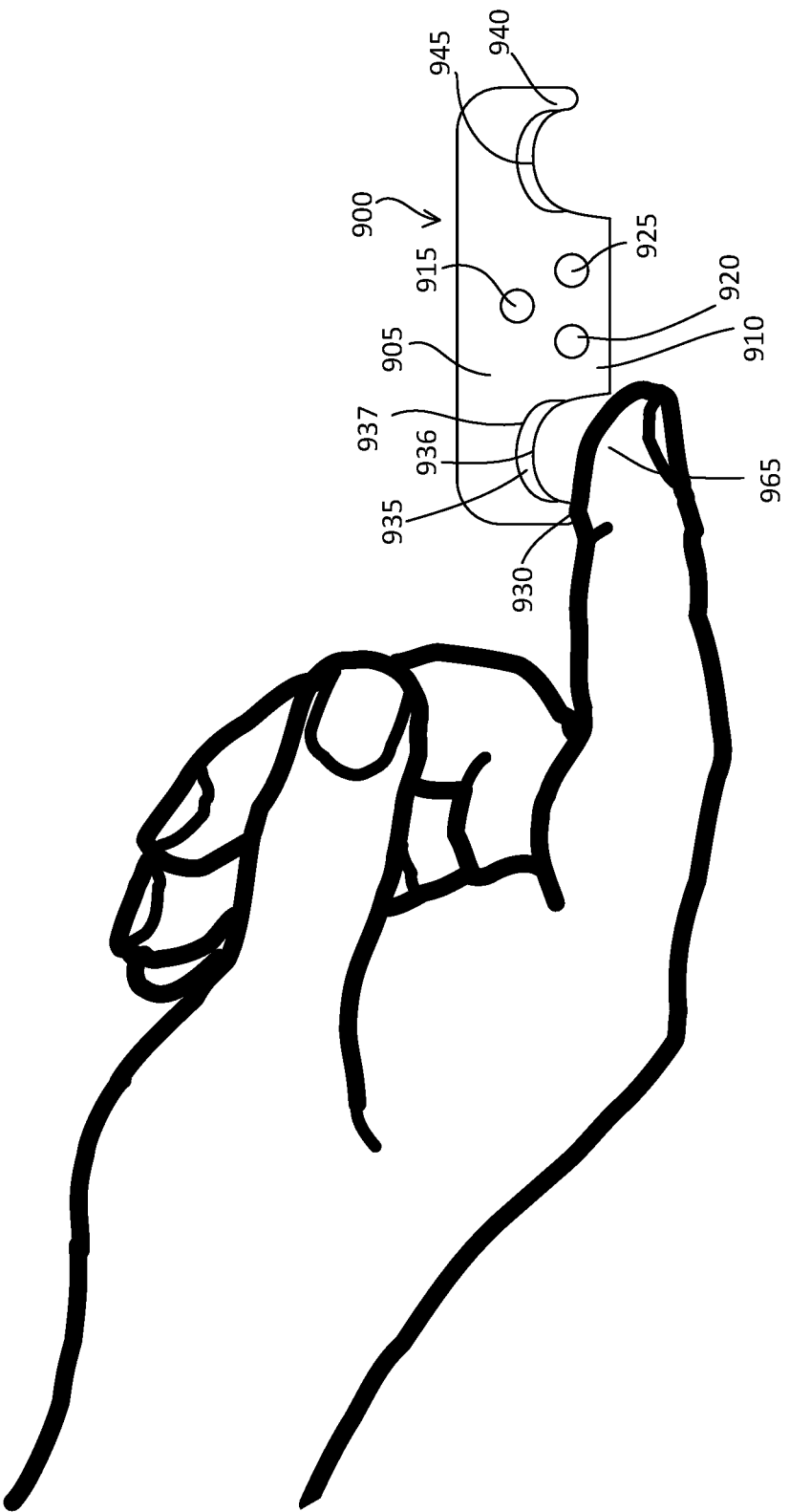
FIG. 9 depicts the safety utility blade of FIGS. 8A and 8B in proximity to a human finger.

Turning to FIG. 9, a safety utility blade 900 is depicted proximate a human finger 965. The safety utility blade 900 may be similar to the safety utility blade 800 of FIGS. 8A and 8B having a first sharpened portion 935 defining a first shoulder 937 and a first cutting edge 936. As can be seen in FIG. 9, a first blade shield 930 may cooperate with the blade attachment portion 910 to limit access of the human finger 965 to the first cutting edge 936. Similarly, the second blade shield 940 may cooperate with the blade attachment portion 910 to limit access to the second sharpened portion 945. In either event, the safety utility blade 900 may be configured to limit access to associated cutting edges while the safety utility blade is being removed from an associated package, being inserted in a corresponding safety utility knife assembly (e.g., safety utility knife assembly 700 of FIG. 7), when being removed from a corresponding safety utility knife assembly and while being used within a corresponding safety utility knife assembly. The safety utility blade 900 may have a body portion 905 constructed similar to the body portion 105. The safety utility blade 900 may include blade securing holes 915, 920, 925 for securing the safety utility blade 900 to a corresponding safety cutting head (e.g., either safety cutting head 1200a or 1200b of FIGS. 12A and 12B, respectively) or securing the safety utility blade to a handle (e.g., a handle 1385 of FIG. 13).

Figure 10A:
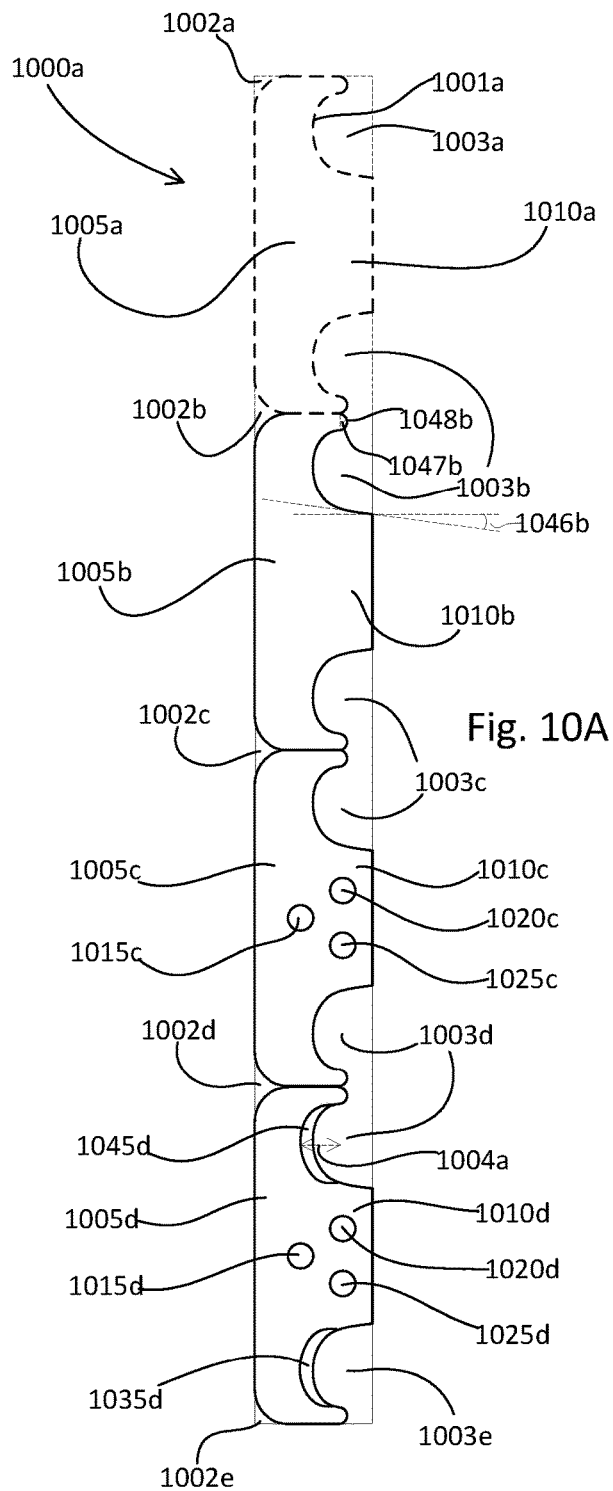
FIG. 10A depicts an example progression of manufacturing the safety utility blade of FIGS. 8A, 8B and 9.

With reference now to FIGS. 10A-10D, a method 1000d of manufacturing a safety utility blade (e.g., safety utility blade 800 of FIG. 8) is described. A strip of blade material 1000a is provided (block 1070d). The individual rough blade shapes 1001a may remain attached to one another while each of the individual steps 1075d-1085d are performed. A rough blade shape 1001a is formed in the strip of blade material 1000a (block 1075d) by removing material 1002a, 1003a, 1002b, 1003b. The material 1002a, 1003a, 1002b, 1003b may be removed from the strip of blade material 1000a by laser cutting, machining, water jet cutting, stamp shearing or any other suitable technique. The material 1002c, 1003c, 1002d, 1003d, 1002e, 1003e may be removed prior to steps 1080d, 1085d being performed or the steps 1080d, 1085d may be performed on each rough blade shape 1001a prior to removing the material 1002c, 1003c, 1002d, 1003d, 1002e, 1003e associated with the next rough blade shape 1001a. An edge (e.g., edge 811 and/or 812 of FIG. 8) of the blade attachment portion 1010b may form an angle 1046b with respect to a blade bottom edge (e.g., bottom 809 of FIG. 8) of approximately 21.2° to encourage material to be cut to move toward the blade end 1047b. The angle 1046b may be between approximately 15° and approximately 25°. As can be seen in FIG. 10A, each rough blade shape 1001a may include a blade body portion 1005a, 1005b, 1005c, 1005d and a blade attachment portion 1010a,

1010*b*, 1010*c*, 1010*d*. Blade securing holes 1015*c*, 1020*c*, 1025*c*, 1015*d*, 1020*d*, 1025*d* may be formed in each rough blade shape 1001*a* (block 1080*d*). The blade securing holes 1015*c*, 1020*c*, 1025*c*, 1015*d*, 1020*d*, 1025*d* may be formed by any suitable method, such as laser cutting, water jet cutting, machining, drilling, stamp shearing, etc.

Figure 10B:
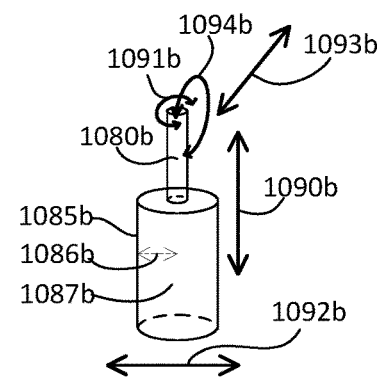
FIG. 10B depicts an example blade edge grinding and honing drum apparatus.

With further reference to FIGS. 10A-10D, a first blade cutting edge 1035*d* and a second blade cutting edge 1045*d* may be formed in each rough blade shape 1001*a* (block 1085*d*). The first blade cutting edge 1035*d* may be formed prior to the second blade cutting edge 1045*d* or the first blade cutting edge 1035*d* and the second blade cutting edge 1045*d* may be formed simultaneously. The first blade cutting edge 1035*d* and the second blade cutting edge 1045*d* may be formed using a blade edge grinding and honing drum 1085*b*, a blade edge grinding and honing wheel 1085*c* or any other suitable method. The blade edge grinding and honing drum 1085*b* may have a radius 1086*b* that is substantially the same as the desired cutting edge radius 1004*a*. The blade edge grinding and honing drum 1085*b* may include a grinding surface 1087*b* of any desired roughness and hardness to form the sharpened surface portion (e.g., sharpened surface portion 1035*d*, 1045*d*). As depicted in FIG. 10B, the blade edge grinding and honing drum 1085*b* may include a spindle 1080*b* for attaching the blade edge grinding and honing drum 1085*b* to an associated driving and actuating machine (not shown) to rotate the blade edge grinding and honing drum 1085*b* or move the blade edge grinding and honing drum 1085*b* in any combination of a x-direction 1092*b*, a y-direction 1090*b* and a z-direction 1093*b* relative to the strip of blade material 1000*a* to produce a sharpened portion 835, 845, 835*b*1, 835*b*2. Alternatively, the strip of blade material 1000*a* may be oriented and moved in any one of or a combination of a x-direction 1092*b*, a y-direction 1090*b* and a z-direction 1093*b* relative to the blade edge grinding and honing drum 1085*b* to produce a sharpened portion 835, 845, 835*b*1, 835*b*2. The blade edge grinding and honing drum 1085*b* may be rotated about a central axis 1091*b* to produce a grinding and honing motion of the grinding surface 1087*b* relative first blade cutting edge 1035*d* and the second blade cutting edge 1045*d*. The blade edge grinding and honing drum 1085*b* rotated into position around a pivot axis 1094*b* when a corresponding rough blade shape 1005*c* is moved into an appropriate position relative the blade edge grinding and honing drum 1085*b*.

Figure 10C:
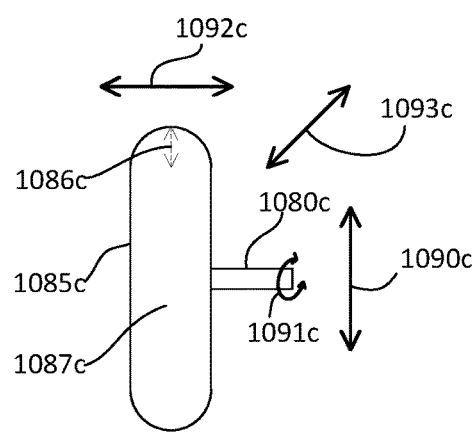
FIG. 10C depicts an example blade edge grinding and honing wheel.
Figures 10D, 10E:
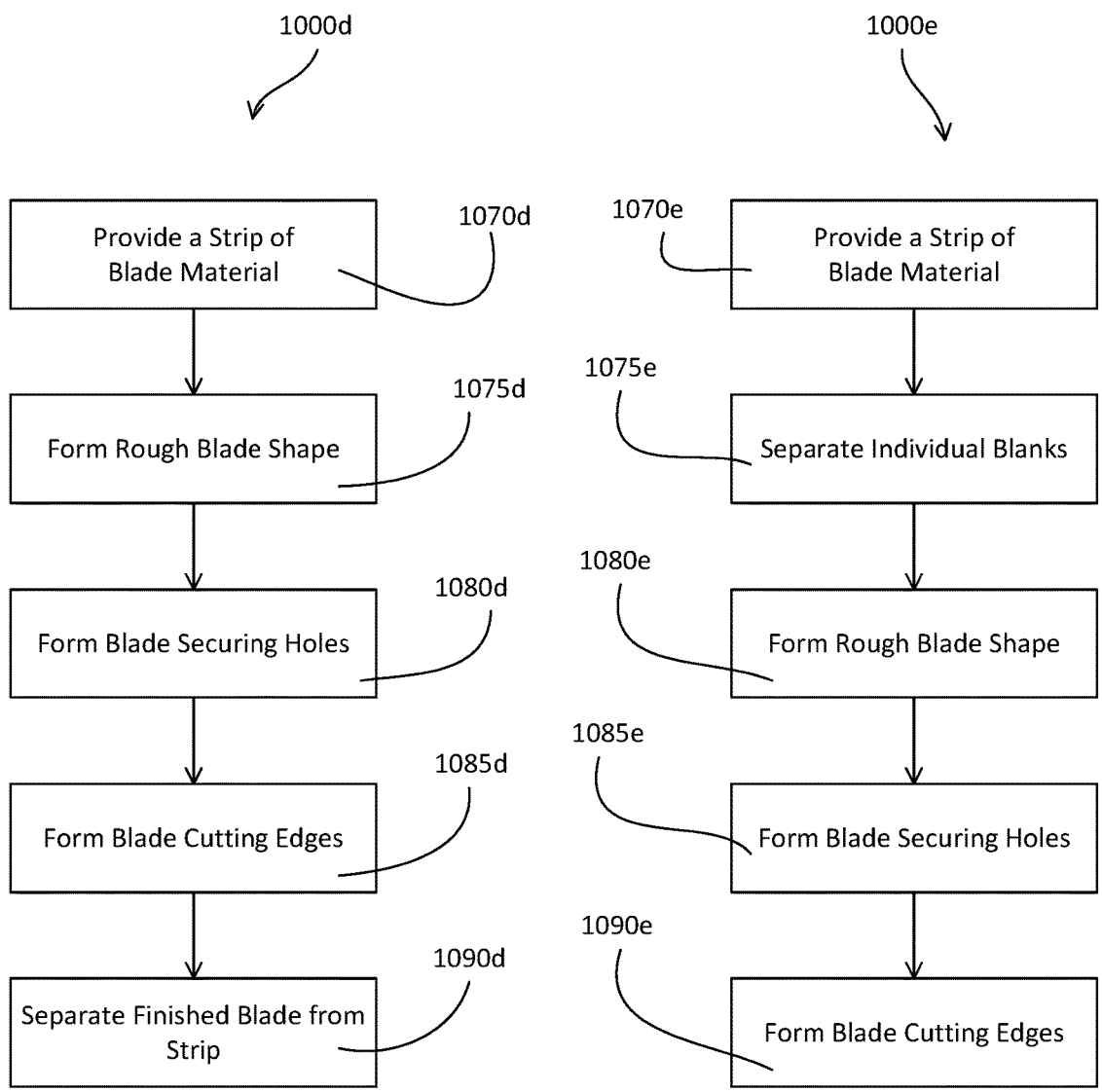
FIG. 10D depicts an example flow diagram for a method of manufacturing the safety utility blade of FIG. 10A.
FIG. 10E depicts an example flow diagram for a method of manufacturing the safety utility blade of FIGS. 11A-11D.

Alternatively, the first blade cutting edge 1035*d* and the second blade cutting edge 1045*d* may be formed using a blade edge grinding and honing wheel 1085*c* or any other suitable method. The blade edge grinding and honing wheel 1085*c* may have a radius 1086*c* that is substantially the same as the desired cutting edge radius 1004*a*. The blade edge grinding and honing wheel 1085*c* may include a grinding surface 1087*c* of any desired roughness and hardness to form the sharpened surface portion (e.g., sharpened surface portion 1035*d*, 1045*d*). As depicted in FIG. 10C, the blade edge grinding and honing wheel 1085*c* may include a spindle 1080*c* for attaching the blade edge grinding and honing wheel 1085*c* to an associated driving and actuating machine (not shown) to rotate the blade edge grinding and honing wheel 1085*c* and/or move the blade edge grinding and honing wheel 1085*c* in any combination of a x-direction 1092*c*, a y-direction 1090*c* and a z-direction 1093*c* relative to the strip of blade material 1000*a* to produce a sharpened portion 835, 845, 835*b*1, 835*b*2. Alternatively, the strip of blade material 1000*a* may be oriented and moved in any one of or a combination of a x-direction 1092*c*, a y-direction 1090*c* and a z-direction 1093*c* relative to the blade edge grinding and honing wheel 1085*c* to produce a sharpened portion 835, 845, 835*b*1, 835*b*2. The blade edge grinding and honing wheel 1085*c* may be rotated about a central axis 1091*c* to produce a grinding and honing motion of the grinding surface 1087*c* relative first blade cutting edge 1035*d* and the second blade cutting edge 1045*d*. The blade edge grinding and honing wheel 1085*c* rotated into position around a pivot axis 1094*c* when a corresponding rough blade shape 1005*c* is moved into an appropriate position relative the blade edge grinding and honing wheel 1085*c*.

Once the blade securing holes 1015*c*, 1020*c*, 1025*c* and the sharpened surface portions 1035*d*, 1045*d* are formed in a respective rough blade shape 1001*a*, the finished safety utility blade 100 may be separated from the strip of blade material 1000*a* (block 1090*d*). Alternatively, with reference to FIGS. 10E and 11A-11D, a strip of blade material 1000*a* may be provided (block 1070*e*) and individual blade blanks 1100*a* may be separated from the strip of blade material 1000*a* (block 1075*e*). Rough blade shapes 1100*b* may be formed from the individual blade blanks 1100*a* by laser cutting, machining, water jet cutting, stamp shearing or any other suitable technique (block 1080*e*). The rough blade shapes may include a blade body portion 405*a*, 405*b*, 405*c*, 405*d* and a blade attachment portion 410*a*, 410*b*, 410*c*, 410*d*. Blade securing holes 415*c*, 420*c*, 425*c*, 415*d*, 420*d*, 425*d* may be formed in the rough blade shapes by any suitable method, such as laser cutting, water jet cutting, machining, drilling, stamp shearing, etc. (block 1085*e*).

With further reference to FIGS. 10E and 11A-11D, a first blade cutting edge 1135*d* and a second blade cutting edge 1145*d* may be formed in each rough blade shape 1100*a* (block 1090*d*). The first blade cutting edge 1135*d* may be formed prior to the second blade cutting edge 1145*d* or the first blade cutting edge 1135*d* and the second blade cutting edge 1145*d* may be formed simultaneously. The first blade cutting edge 1135*d* and the second blade cutting edge 1145*d* may be formed using a blade edge grinding and honing drum 385*b*, a blade edge grinding and honing wheel 385*c* or any other suitable method. The blade edge grinding and honing drum 385*b* may have a radius 386*b* that is substantially the same as the desired cutting edge radius 1004*a*. The blade edge grinding and honing drum 1085*b* may include a grinding surface 1087*b* of any desired roughness and hardness to form the sharpened surface portion (e.g., sharpened surface portion 1135*d*, 1145*d*). As depicted in FIG. 10B, the blade edge grinding and honing drum 1085*b* may include a spindle 1080*b* for attaching the blade edge grinding and honing drum 1085*b* to an associated driving and actuating machine (not shown) to rotate the blade edge grinding and honing drum 1085*b* or move the blade edge grinding and honing drum 1085*b* in any combination of a x-direction 1092*b*, a y-direction 1090*b* and a z-direction 1093*b* relative to the rough blade shape 1100*b*. Alternatively, the rough blade shape 1100*b* may be oriented and moved in any one of or a combination of a x-direction 1092*b*, a y-direction 1090*b* and a z-direction 1093*b* relative to the blade edge grinding and honing drum 1085*b*.

Alternatively, the first blade cutting edge 1135*d* and the second blade cutting edge 1145*d* may be formed using a blade edge grinding and honing wheel 1085*c* or any other suitable method. The blade edge grinding and honing wheel 1085*c* may have a radius 1086*c* that is substantially the same as the desired cutting edge radius 1004*a*. The blade edge grinding and honing wheel 1085*c* may include a grinding surface 1087*c* of any desired roughness and hardness to form the sharpened surface portion (e.g., sharpened surface portion 1135*d*, 1145*d*). As depicted in FIG. 3C, the blade edge grinding and honing wheel 385c may include a spindle 380c for attaching the blade edge grinding and honing wheel 385c to an associated driving and actuating machine (not shown) to rotate the blade edge grinding and honing wheel 385c and/or move the blade edge grinding and honing wheel 385c in any combination of a x-direction 392c, a y-direction 1090c and a z-direction 1093c relative to the rough blade shape 1100b. Alternatively, the rough blade shape 1100b may be oriented and moved in any one of or a combination of a x-direction 31092c, a y-direction 390c and a z-direction 1093c relative to the blade edge grinding and honing wheel 1085c.

Whether the safety utility blade 800 is completed prior to separating the rough blade shapes 1001a from the strip of blade material 1000a or the safety utility blade 800 is completed after the individual blade blanks 1100a are separated from a strip of blade material 1000a, a series of grinding and honing drums 1085b and/or grinding and honing wheels 1085c may be used to form the sharpened surface portion 1035d, 1045d, 1135d, 1145d. Each grinding and honing drum 1085b and/or grinding and honing wheel 1085c in a series of grinding and honing drums 1085b and/or grinding and honing wheels 1085c may have a progressively finer and finer grinding and honing surface 1087b, 1087c relative to the preceding grinding and honing drum 1085b and/or grinding and honing wheel 1085c in the series.

Figure 12A:
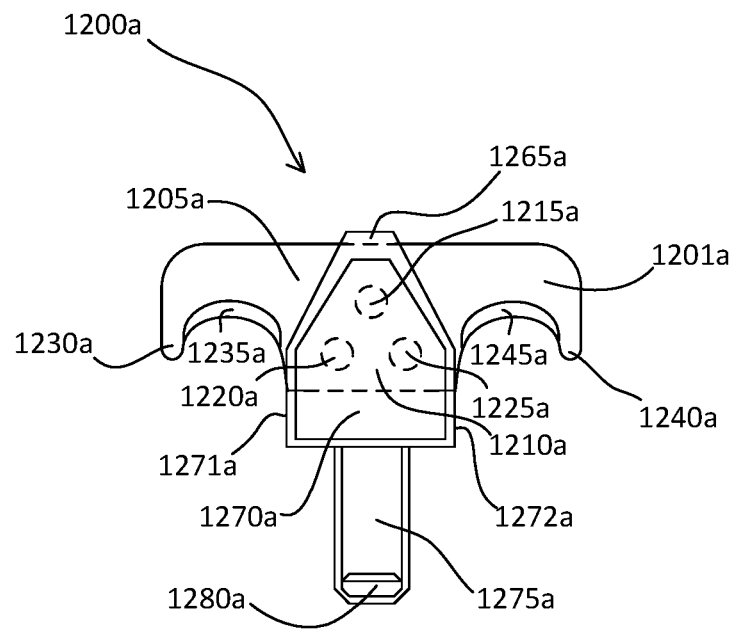
FIGS. 12A and 12B depict examples of safety cutter heads which include a safety utility blade of FIGS. 8A, 8B, 9, 10A and 11A-11D.

Turning to FIG. 12A, a safety cutting head 1200a is depicted including a safety utility blade 1201a attached to a handle adaptor 1270a. The safety utility blade 1201a may include a blade body portion 1205a, an blade attachment portion 1210a, blade securing holes 1215a, 1220a, 1225a, a first sharpened portion 1235a, a first blade shield 1230a, a second sharpened portion 1245a and a second blade shield 1240a. The handle adaptor 1270a may include a body portion 1265a having a first side 1271a and a second side 1272a. As depicted in FIG. 12A, the width of the body portion 1265a may be substantially equal the width of the blade attachment portion 1210a. As also depicted in FIG. 12A, the body portion 1265a may extend beyond the blade body portion 1205a. The extension of the body portion 1265a may cooperate with the securing holes 1215a, 1220a, 1225a to secure the safety utility blade 1201a to the handle adaptor 1270a. For example, the handle adaptor may be made of a thermal plastic material and may be co-molded around the safety utility blade 1201a such that the thermal plastic material penetrates through the blade securing holes 1215a, 1220a, 1225a and form a mirror half of the body portion 1265a on either side of the safety utility blade 1201a to encapsulate the blade body portion 1205a of the safety utility blade 1201a. The handle adaptor 1270a may include a handle engagement portion 1275a with a handle securing mechanism 1280a to secure the safety cutting head 1200a to a corresponding handle (e.g., handle 1385 of FIG. 13).

Figure 12B:
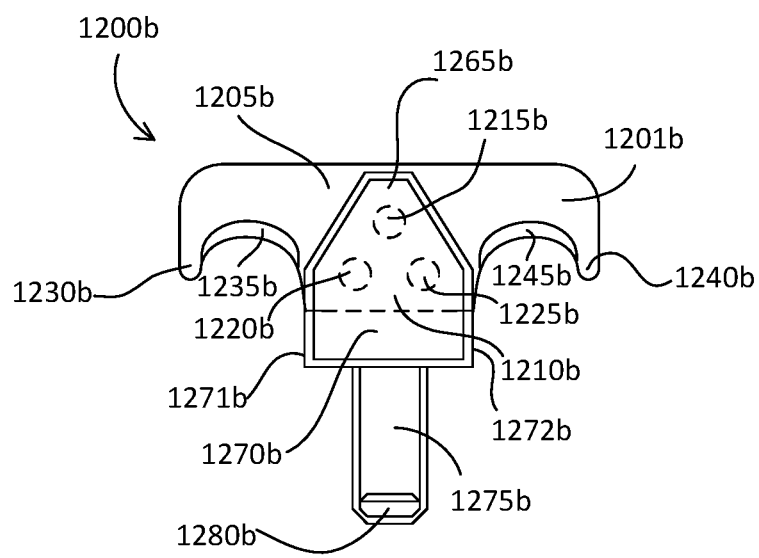

Turning to FIG. 12B, a safety cutting head 1200b is depicted including a safety utility blade 1201b attached to a handle adaptor 1270b. The safety utility blade 1201b may include a blade body portion 1205b, an blade attachment portion 1210b, blade securing holes 1215b, 1220b, 1225b, a first sharpened portion 1235b, a first blade shield 1230b, a second sharpened portion 1245b and a second blade shield 1240b. The handle adaptor 1270b may include a body portion 1265a having a first side 1271b and a second side 1272b. As depicted in FIG. 12A, the width of the body portion 1265b may be substantially equal the width of the blade attachment portion 1210b. The body portion 1265b may cooperate with the securing holes 1215b, 1220b, 1225b to secure the safety utility blade 1201b to the handle adaptor 1270b. For example, the handle adaptor may be made of a thermal plastic material and may be co-molded around the safety utility blade 1201b such that the thermal plastic material penetrates through the blade securing holes 1215b, 1220b, 1225b and form a mirror half of the body portion 1265b on either side of the safety utility blade 1201b to encapsulate the blade body portion 1205b of the safety utility blade 1201b. The handle adaptor 1270b may include a handle engagement portion 1275b with a handle securing mechanism 1280b to secure the safety cutting head 1200b to a corresponding handle (e.g., handle 1385 of FIG. 13). A first side 1271b and a second side 1272b of a handle adaptor 1270b may cooperate with a body portion 1265b to form a "clamshell" and fasteners, such as metal pins, may be included to cooperate with the securing holes 1215b, 1220b, 1225b to replaceably secure a safety utility blade 100 within a safety cutting head 1200b. When a clamshell structure is provided, a handle engagement portion 1275b may be configured with two halves with each halve being fixed to a respective side 1271b, 1272b of the handle adaptor 1270b. When a safety utility blade 800 is placed within a clamshell structure and the clamshell structure is engaged with a handle 1385, the safety utility blade 800 is secured within the clamshell structure of the safety cutting head 1200b. The body portion 1265b may be configured as a hinge mechanism within a clamshell structure and fasteners, such as metal pins, may be fixed to a respective side 1271b, 1272b of the handle adaptor 1270b.

Figure 13:
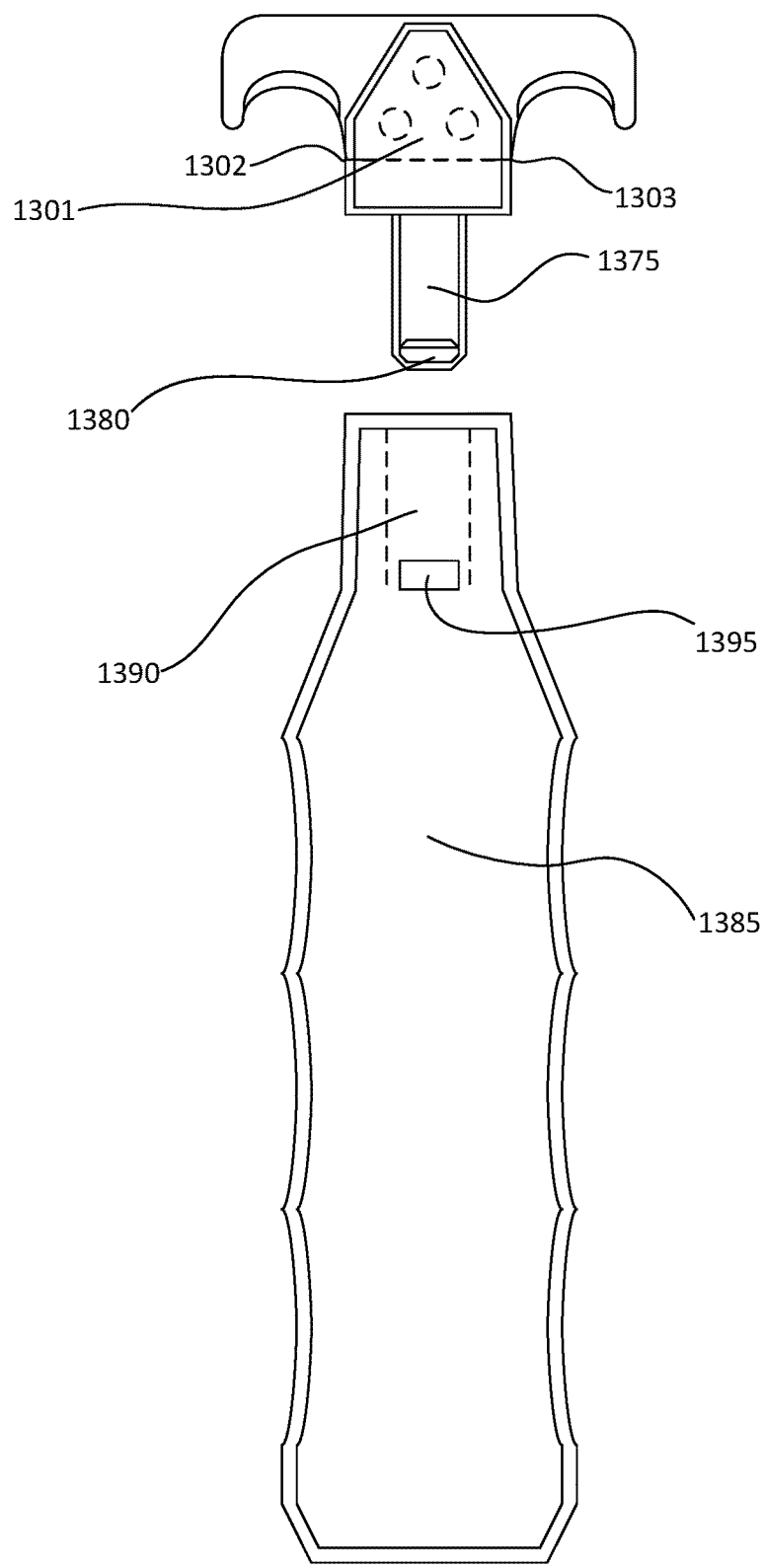
FIG. 13 depicts the safety cutter head of FIG. 12B proximate an associated safety utility knife handle.

Turning to FIG. 13, a safety cutting head 1301 is depicted proximate an associated handle 1385. The safety cutting head 1301 may include a first body side 1302 and a second body side 1303. The safety cutting head 1301 may include a handle engagement 1375 having a handle securing mechanism 1380. The handle 1385 may include a cutting head engagement 1390 having a cutting head securing mechanism 1395.

Figure 14:
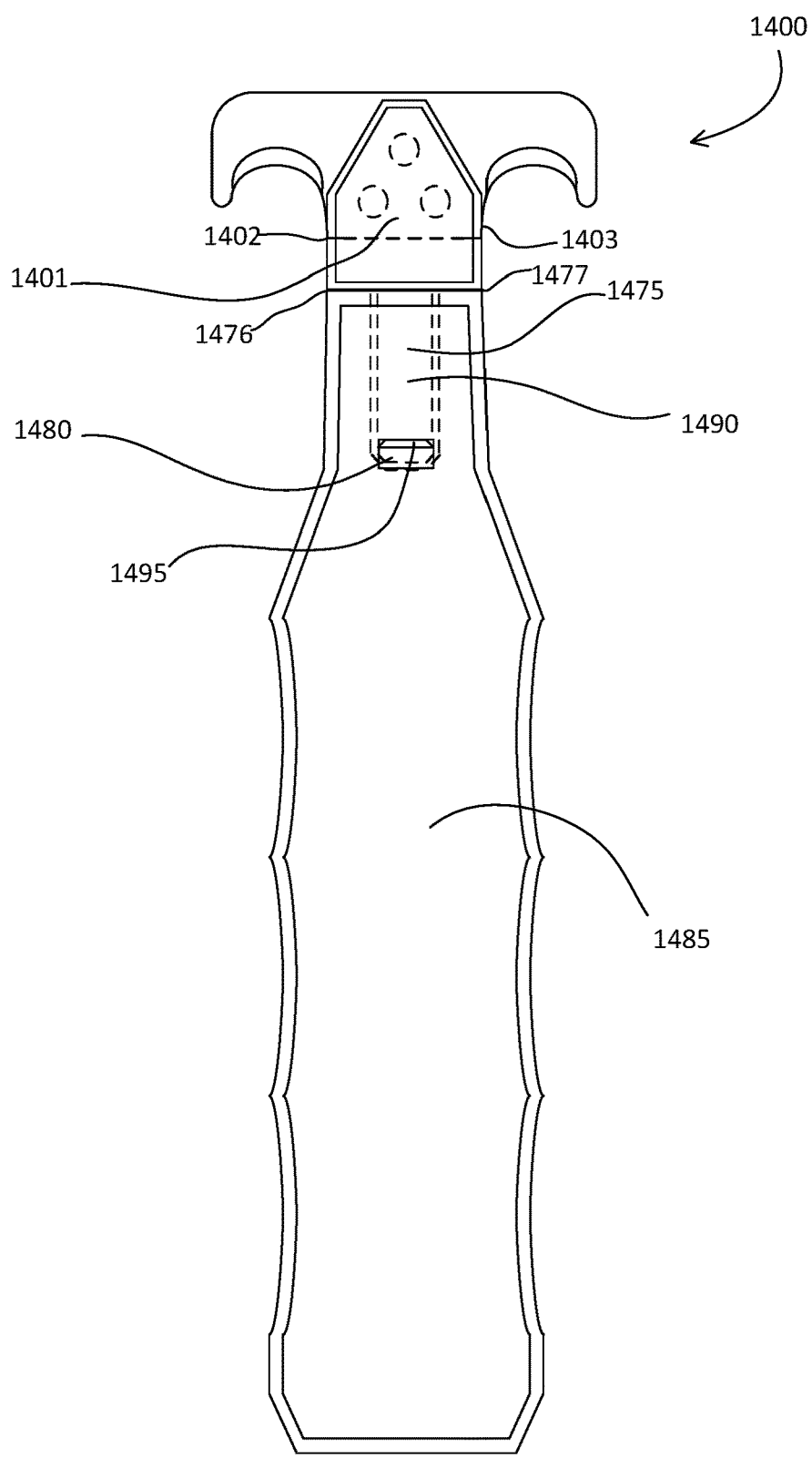
FIG. 14 depicts the safety cutter head of FIG. 12B engaged with an associated safety utility knife handle to form a safety utility knife assembly.

With reference now to FIG. 14, a safety utility knife assembly 1400 is depicted including a safety cutting head 1401 and a handle 1485. The safety cutting head 1401 may include a first side 1402 that aligns with a first handle side 1476 and a second side 1403 that aligns with a second handle side 1477 when the handle engagement 1475 is secured to the cutting head engagement 1490 via the handle securing mechanism 1480 and the cutting head securing mechanism 1495. A safety utility knife assembly 1400 may be configured to store one or more additional safety cutting heads 1401. For example, a second safety cutting head 1401 may be secured to each end of the handle 1485. Alternatively, the handle 1485 may include a spare safety cutting head 1401 retaining mechanism.

Turning now to FIGS. 15A-15H and 15J-15K, a safety utility knife assembly 1500a, 1500b, 1500c, 1500d, 1500e, 1500f, 1500g, 1500h, 1500j, 1500k is depicted including a blade 1510a, 1510b, 1510c, 1510e, 1510f, 1510g, 1510k within a blade holder 1505a, 1505b, 1505c, 1505d, 1505e, 1505f, 1505g, 1505j, 1505j, 1505k inserted in a handle 1515a, 1515b, 1515c, 1515d, 1515e, 1515f, 1515g, 1515h, 1515j, 1515k. The blade holder 1505a, 1505b, 1505c, 1505d, 1505e, 1505f, 1505g, 1505j, 1505j, 1505k may include a handle engagement 1506b, 1506d, 1506e, 1506f, 1506g, 1506j a blade retaining offset 1508e and blade retainer 1507d, 1507e. The handle 1515a, 1515b, 1515c, 1515d, 1515e may include a blade holder engagement 1516b, 1516e, 1516f that cooperates with the handle engagement 1506b, 1506d, 1506e, 1506f, 1506g, 1506j to secure the blade holder 1505a, 1505b, 1505c, 1505d, 1505e, 1505f, 1505g, 1505j, 1505j, 1505k within the handle 1515a, 1515b, 1515c, 1515*d*, 1515*e*, 1515*f*, 1515*g*, 1515*h*, 1515*j*, 1515*k*. The blade retaining offset 1508*e*, a first blade retainer 1507*d*, 1507*e*, 1507*f*, a second blade retainer 1508*f* and a third blade retainer 1509*f* cooperate with the handle 1515*a*, 1515*b*, 1515*c*, 1515*d*, 1515*e* to secure the blade edge 1512*c*, 1512*f* proximate a blade retaining offset surface 1511*c*, 1511*f*. The safety utility knife assembly 1500*a*, 1500*b*, 1500*c*, 1500*d*, 1500*e*, 1500*f*, 1500*g*, 1500*h*, 1500*j*, 1500*k* may include a spare blade compartment to store unused blades 1510*a*, 1510*b*, 1510*c*, 1510*e*, 1510*f*, 1510*g*, 1510*k*.

Figure 16A:
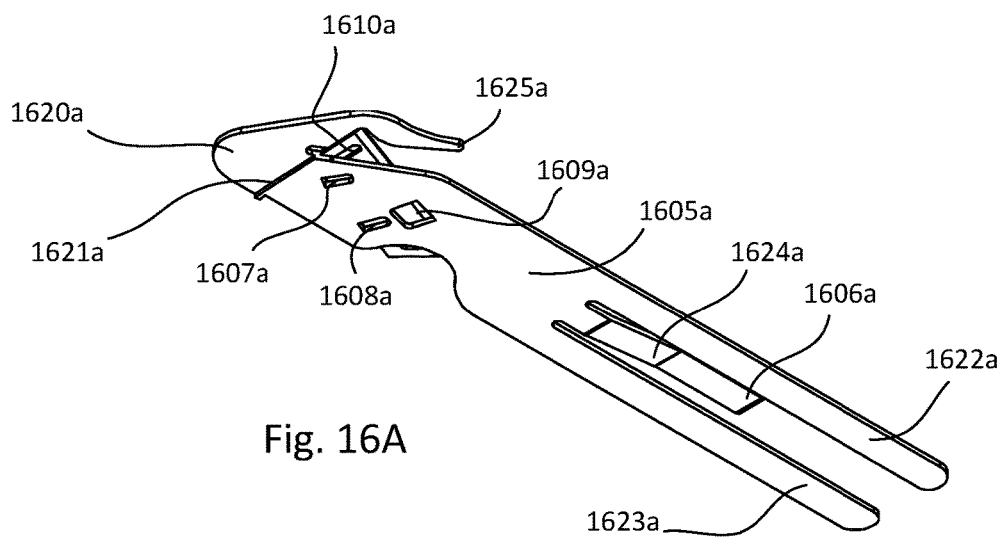
FIGS. 16A-16H and 16J depict an example blade carriage for use within the safety utility knife assembly of FIGS. 15A-15H and 15J.
Figure 16B:
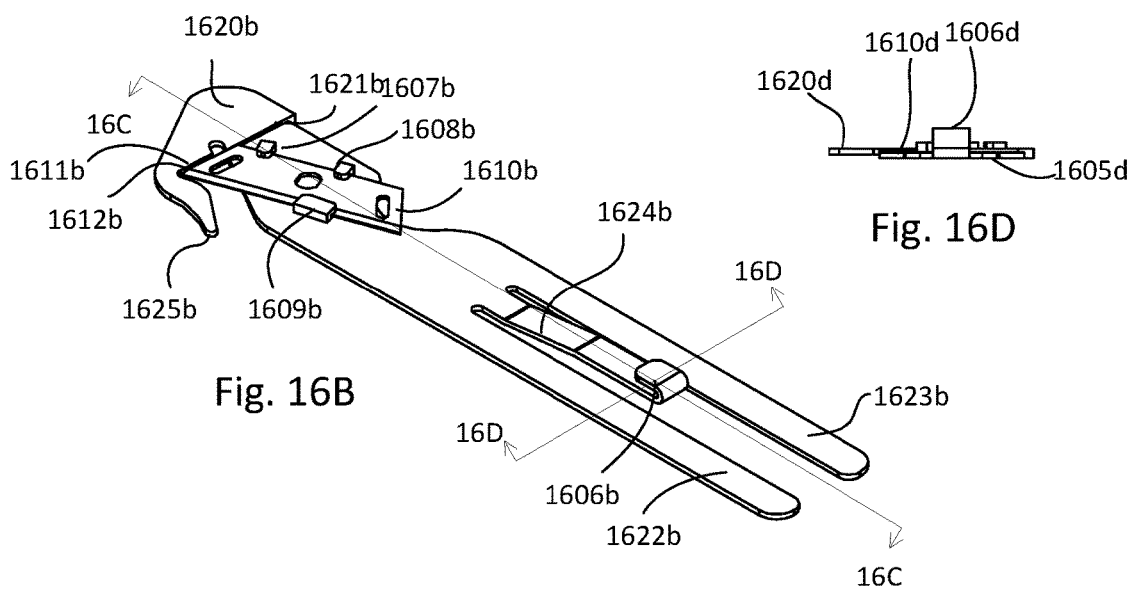
Figure 16D:
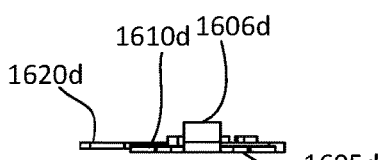
Figure 16C:
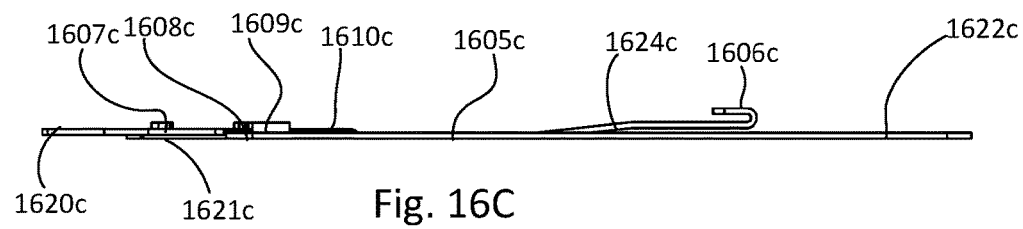
Figure 16E:
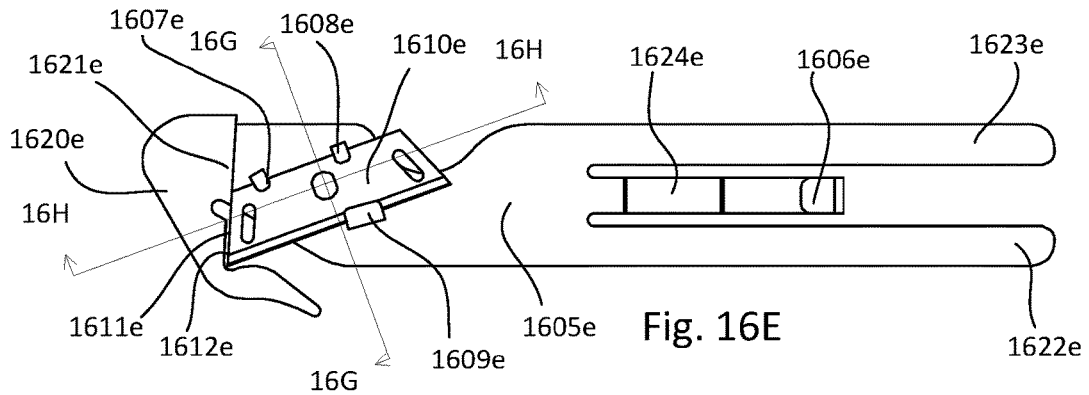
Figure 16F:
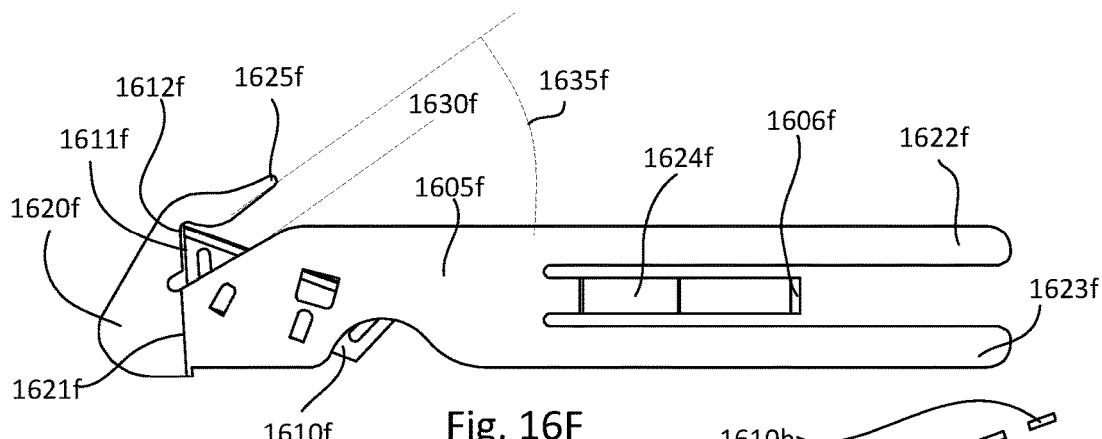
Figure 16H:
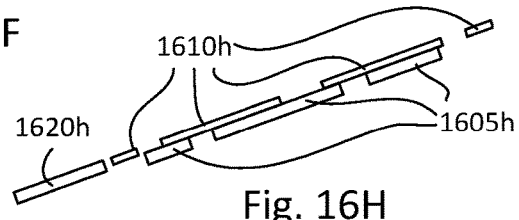
Figure 16G:
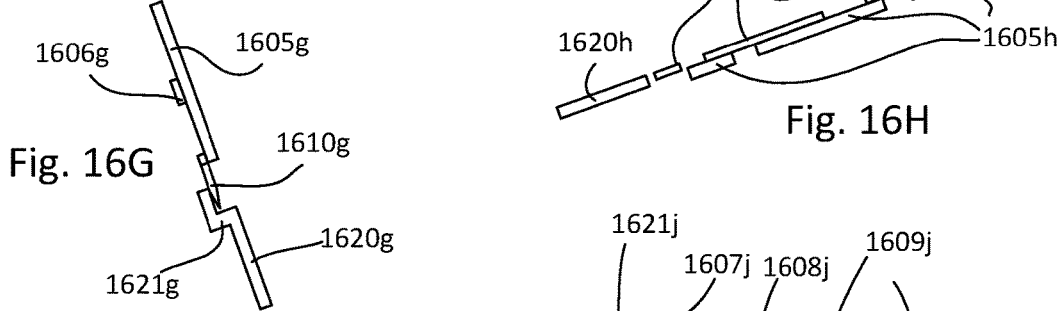
Figure 16J:
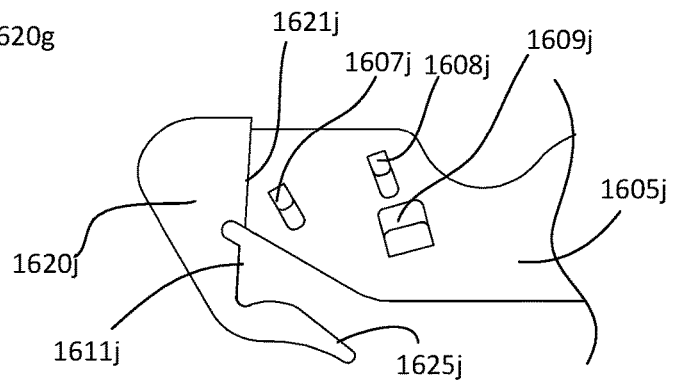

With reference to FIGS. 16A-16H and 16J a blade holder 1605*a*, 1605*b*, 1605*c*, 1605*d*, 1605*e*, 1605*f*, 1605*g*, 1605*h*, 1605*j* is depicted including a blade edge 1612*b*, 1612*e*, 1612*f* of blade 1610*a*, 1610*b*, 1610*c*, 1610*d*, 1610*e*, 1610*f*, 1610*g*, 1610*h*, 1610*j* secured against a blade retaining offset surface 1611*b*, 1611*e*, 1611*f* of the blade holder 1605*a*, 1605*b*, 1605*c*, 1605*d*, 1605*e*, 1605*f*, 1605*g*, 1605*h*, 1605*j* by a first blade retainer 1607*a*, 1607*b*, 1607*c*, 1607*e*, 1607*j*, a second blade retainer 1608*a*, 1608*b*, 1608*c*, 1608*e*, 1608*j* and a third blade retainer 1609*a*, 1609*b*, 1609*c*, 1609*e*, 1609*j*. A blade holder head 1620*a*, 1620*b*, 1620*c*, 1620*d*, 1620*e*, d20*f*, 1620*g*, 1620*h*, 1620*j* and blade shield 1625*a*, 1625*b*, 1625*f*, 1625*j* are offset from the blade holder 1605*a*, 1605*b*, 1605*c*, 1605*d*, 1605*e*, 1605*f*, 1605*g*, 1605*h*, 1605*j* at offset surface 1621*a*, 1621*b*, 1621*c*, 1621*e*, 1621*f*, 1621*g*, 1621*j* by a distance substantially equal to a thickness (e.g., thickness 806*b* of FIG. 8B) of the blade 1610*a*, 1610*b*, 1610*c*, 1610*d*, 1610*e*, 1610*f*, 1610*g*, 1610*h*, 1610*j*. The blade holder 1605*a*, 1605*b*, 1605*c*, 1605*d*, 1605*e*, 1605*f*, 1605*g*, 1605*h*, 1605*j* may include a first slide 1622*a*, 1622*b*, 1622*c*, 1622*e*, 1622*f* and a second slide 1623*a*, 1623*b*, 1623*e*, 1623*f* that are received within a corresponding handle 1515*a*, 1515*b*, 1515*c*, 1515*d*, 1515*e*, 1515*f*, 1515*g*, 1515*h*, 1515*j*, 1515*k* and secured within the handle 1515*a*, 1515*b*, 1515*c*, 1515*d*, 1515*e*, 1515*f*, 1515*g*, 1515*h*, 1515*j*, 1515*k* with handle engagement mechanism 1606*a*, 1606*b*, 1606*c*, 1606*d*, 1606*e*, 1606*f* with biasing member 1624*a*, 1624*b*, 1624*c*, 1624*e*, 1624*f*. As depicted in FIG. 16F, a blade throat 1630*f* defines an angle 1635*f* with respect to a longitudinal axis of the blade holder 1605*f* of approximately 38°. The angle 1635*f* may be between approximately 30° and approximately 45°. The blade throat 1630*f* may define an angle 1635*f* with respect to a longitudinal axis of the blade holder 1605*f* between 25° and 50°. The blade throat 1630*f* may be approximately 0.188 inches, thereby, the blade throat 1630*f* limits exposure to the cutting edge of the blade 1610*f*. The cutting edge of the blade 1610*f* may define an angle (e.g., angle 1513*c* of FIG. 15C) with respect to a longitudinal axis of the blade holder 1605*f* of approximately 20°. The cutting edge of the blade 1610*f* may define an angle 1513*c* with respect to a longitudinal axis of the blade holder 1605*f* between 15° and 25°.

Figure 17A:
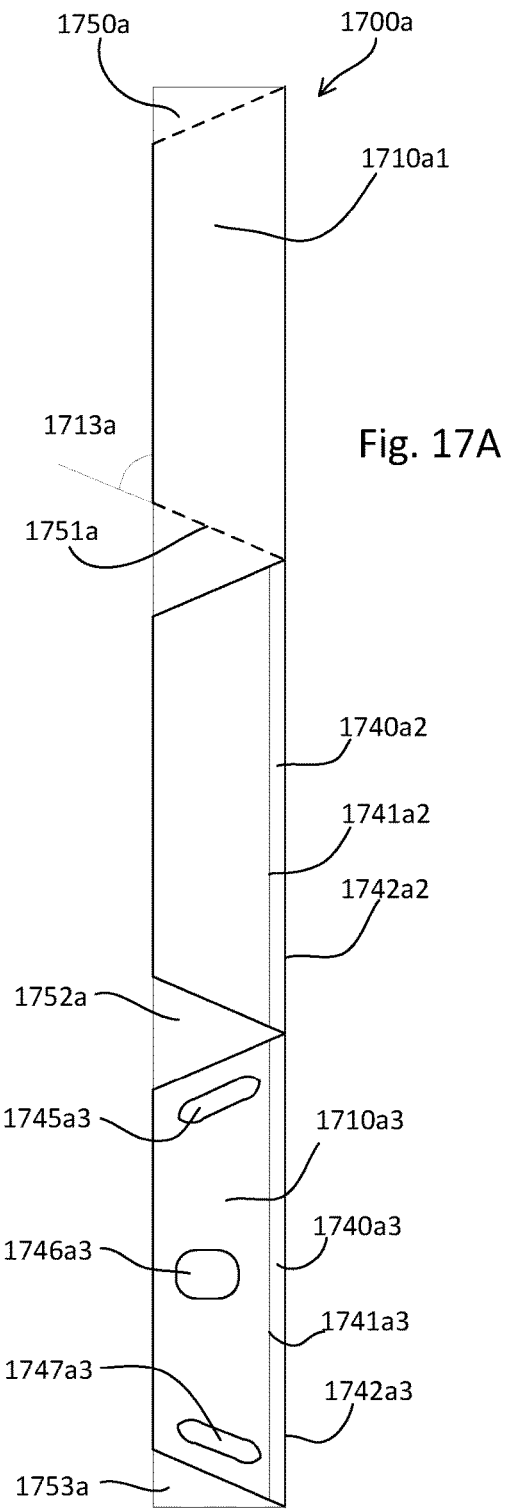
FIG. 17A depicts an example progression of manufacturing a blade for use in the safety utility knife assembly of FIGS. 16A-16H and 16J.
Figure 17B:
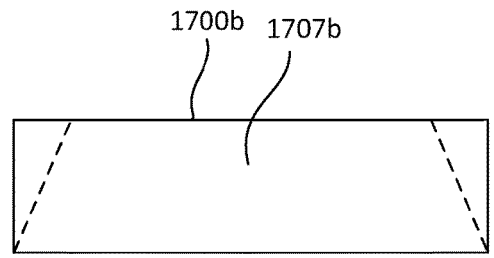
FIGS. 17B-17D depict a second example progression of manufacturing a blade for use in the safety utility knife assembly of FIGS. 16A-16H and 16J.
Figure 17C:
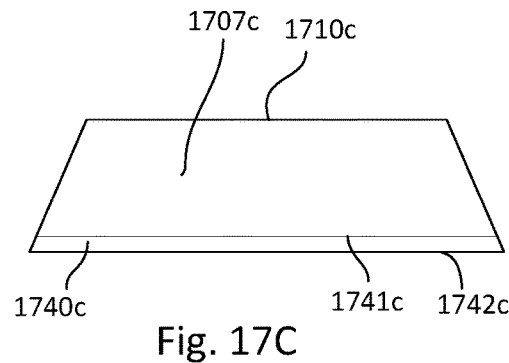
Figure 17D:
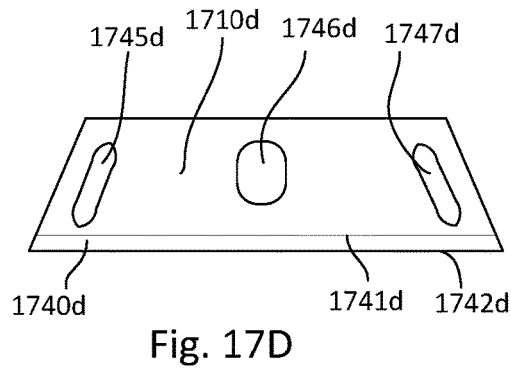

Turning to FIGS. 17A and 17E, a method 1700*e* of manufacturing a blade 1710*a*3 for use in a safety utility knife assembly (e.g., safety utility knife assembly 1500*a* of FIG. 15A) may include providing a strip of blade material 1700*a* (block 1770*e*). A rough blade shape 1710*a*1 may be formed by removing material 1750*a* (block 1775*e*). Blade securing holes 1745*a*3, 1746*a*3, 1747*a*3 may be formed in the rough blade shape 1710*a*1 by any suitable method, such as laser cutting, water jet cutting, machining, drilling, stamp shearing, etc. (block 1780*e*). A sharpened portion 1740*a*2, 1740*a*3 may be formed by any suitable method, such as those disclosed in U.S. Pat. Nos. 4,265,055, 5,842,387, 6,860,796 or 8,206,199, for example (block 1785*e*). The sharpened portion 1740*a*2, 1740*a*3 may define a shoulder 1741*a*2, 1741*a*3 and a cutting edge 1742*a*2, 1742*a*3. The blade 1710*a*3 may be separated from the strip of blade material 1700*a* by removing material 1752*a*, 1753*a* (block 1790*e*). A blade end 1751*a* may form an angle 1713*a* with respect to a linear edge of the strip of blade material 1700*a* of approximately 60°. The angle 1713*a* may be between approximately 55° and approximately 70°.

With reference now to FIGS. 17B-17D and 17F, a method 1700*f* of manufacturing a blade 1710*d* for use in a safety utility knife assembly (e.g. safety utility knife assembly 800*a* of FIG. 8A) may include providing a strip of blade material 1700*a* (block 1770*f*). Blade blanks 1700*b* may be formed from the strip of blade material 1700*a* (block 1775*f*). Rough blade shapes 1707*b* may be formed from the blade blanks 1700*b* (block 1780*f*). Blade securing holes 1745*b*, 1746*b*, 1747*b* may be formed in the rough blade shape 1700*b* by any suitable method, such as laser cutting, water jet cutting, machining, drilling, stamp shearing, etc. (block 1785*f*). A sharpened portion 1740*c*, 1740*d* may be formed by any suitable method, such as those disclosed in U.S. Pat. Nos. 4,265,055, 5,842,387, 6,860,796 or 8,206,199, for example (block 1790*f*). The sharpened portion 1740*c*, 1740*d* may define a shoulder 1741*c*, 1741*d* and a cutting edge 1742*c*, 1742*c*.

Figure 18:
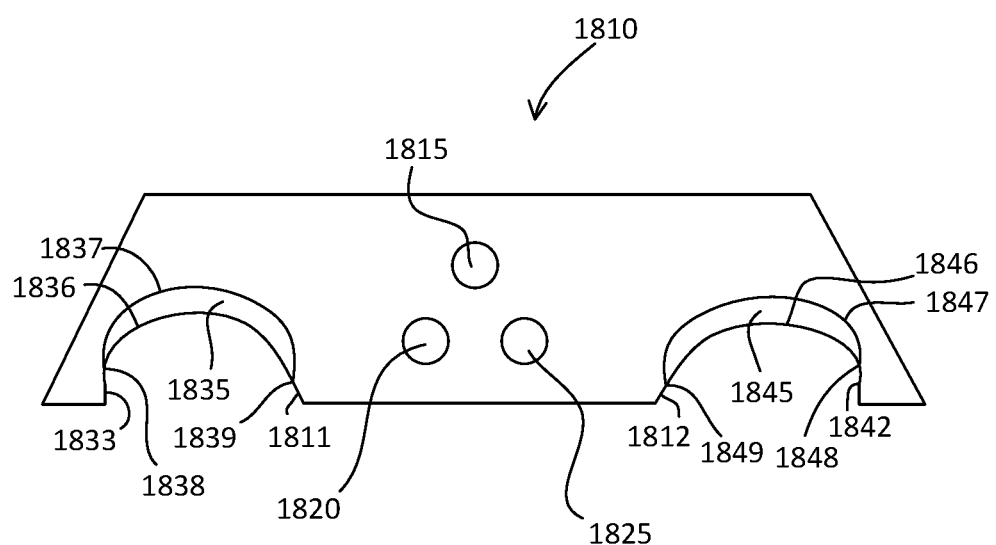
FIG. 18 depicts an example safety utility blade for use in a safety utility knife assembly as in FIGS. 16A-16H and 16J.

With reference to FIG. 18, a safety utility blade 1810 for use in the safety utility knife assembly 1500*a* of FIG. 15A may have a body 1810*a* formed from a relatively thin and substantially flat material 1000*a*, such as ceramic, heat treated carbon steel, ceramic coated steel, stainless steel, Teflon coated material, etc. For example, the material 1000*a* may be approximately 0.025 inches thick. A blade blank (e.g. blade blank 1000*a*, 1000*b* of FIGS. 10A and 10B, respectively) may be 1.0964567 inches from a first end 1050*a* to a second end 1051*a* and 0.3917323 inches from a top side 1010*c* to a bottom side 1042*d*. The safety utility blade may include blade securing holes 1815, 1820, 1825. As described herein the blade securing holes 1815, 1820, 1825 may, at least in part, secure a safety utility blade 1810 to a safety utility knife cutting head (e.g., safety utility knife cutting head 1620*j* of FIG. 16J). The safety utility blade 1810 may be formed from a suitable material 1000*a* for retaining a sharpened edge 1836, 1837, and, when that material 1700*a* is metal, the body 1810*a* preferably has a thickness 806*b* of at least 0.0156 inches and preferably not greater than about 0.0313 inches. What might be characterized as a "heavy-duty" safety utility blade 800 is approximately 0.025 inches thick, and the thickness 806*b* for what might be characterized as a "regular duty" safety utility blade 1810 is approximately 0.017 inches. The sharpened portion 1835, 1845 is approximately 0.0492 inches high.

With further reference to FIG. 18, the first sharpened portion 1835 of the safety utility blade 1810 may include a first shoulder 1837, a first cutting edge 1836, a first heal 1839 and a first toe 1838. The safety utility blade may include a first edge 1811 extending from the first heal 1839 to the bottom side. The safety utility blade 1810 may further include a first inner edge 1833 that extends from the first toe 1839 to the bottom side and may have a thickness that is greater than the first sharpened portion 1835 and less than or equal to the thickness 176*b* of the body 1705*a*. The first edge 1818 and the first inner edge 1833 may cooperate to limit access to the cutting edge 1836 while the safety utility blade 1810 is being used in the safety utility knife assembly 1500*a*, while the safety utility blade 1810 is being inserted into the safety utility knife assembly 1500*a*, while the safety utility blade 1810 is being removed from the safety utility knife assembly 1500*a* and while the safety utility blade 1810 is being handled while removed from the safety utility knife assembly 1500*a*.

With further reference to FIG. 18, the safety utility blade 1810 may include a second sharpened portion 1845 which may include a second shoulder 1847, a second cutting edge 1846, a second heal 1849 and a second toe 1848. The safety utility blade 1810, 810*b* may include a second edge 1812 extending from the second heal 1849 to the bottom side. The safety utility blade 1810 may further include a second inner edge 1843 that extends from the second toe 1849 to the bottom side and may have a thickness that is greater than the second sharpened portion 1845 and less than or equal to the thickness 806*b* of the body 1705*a*. As depicted in FIG. 8B, the cutting edge 836*b* may be defined by a third sharpened portion 835*b*1 extending from a third shoulder 837*b*1 and a fourth sharpened portion 835*b*2 extending from a fourth shoulder 837*b*2. It should be understood that either of the cutting edges 1836, 1846 may be formed similar to cutting edge 836*b*. The second edge 1812 and the second inner edge 1843 may cooperate to limit access to the cutting edge 1846 while the safety utility blade 1810 is being used in the safety utility knife assembly 1500*a*, while the safety utility blade 1810 is being inserted into the safety utility knife assembly 1500*a*, while the safety utility blade 1810 is being removed from the safety utility knife assembly 1500*a* and while the safety utility blade 1810 is being handled while removed from the safety utility knife assembly 1500*a*. A safety utility blade 1810 may be manufactured similar to the safety utility blade 800 as described with reference to FIGS. 10A-10E and 11A-11D.

The figures depict preferred embodiments of safety blades for use in utility knife assemblies, utility knife assemblies and methods of manufacturing. One skilled in the art will readily recognize from the corresponding written description that alternative embodiments of the structures and methods illustrated herein may be employed without departing from the principles described.

With additional reference to FIG. 15B, a lock 1516*b*1 may be provided, for example, for safety knife assemblies 1500*b* for use in food service industries where companies want users to remove the associated blade outside of production areas. The lock 1516*b*1 may be located over top of the button 1506*b* in a shape of, for example, a "dog house" that covers the opening where the tab 1506*b* is pushed down for release of the blade holder. A mating release key (not shown in the Figures) may be provide which may, for example, enter from an end 1517*b* of the handle and presses the tab 1516*b* down, which may release the blade holder portion for blade replacement. Alternatively, or additionally, a mating release key may be provided that may be inserted into the lock 1516*b*1 to engage the tab 1516*b*.

Upon reading this disclosure, those of skill in the art will appreciate still additional alternative structural and functional designs for safety blades for use in utility knife assemblies, utility knife assemblies and methods of manufacturing. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the apparatuses and methods disclosed herein without departing from the spirit and scope defined in the appended claims.

What is claimed is:

1. A safety utility knife assembly, comprising:
   a handle having a blade retainer release button aperture;
   a blade retainer having an upwardly extending blade retainer release button extending outwardly and an upwardly extending blade retainer catch, wherein the blade retainer release button is received within the blade retainer release button aperture and accessible therefrom when the blade retainer is inserted into the handle; and
   a replaceable safety blade carried by the blade retainer and having a blade retainer securing aperture, wherein the replaceable safety blade is removable from the safety utility knife assembly when a user presses on the blade retainer release button to disengage the blade retainer catch from the blade retainer securing aperture for allowing removal of the blade from the blade retainer, wherein the blade retainer further comprises a longitudinally extending resilient arm having one fixed end and an opposing distal end, wherein the blade retainer catch is disposed at the distal end, wherein the blade retainer release button is disposed on the longitudinally extending resilient arm between the one fixed end and the opposing distal end, wherein the resilient arm flexes at the fixed end, and wherein the blade retainer catch moves in the same direction as the blade retainer release button to release the blade retainer catch from the blade retainer securing aperture and allow the replaceable safety blade to be removed from the handle.

2. The safety utility knife assembly as in claim 1, further comprising a first blade throat configured to limit access to a first cutting edge of the replaceable safety blade when the replaceable safety blade is secured within the safety utility knife assembly.

3. The safety utility knife assembly as in claim 2, further comprising a second blade throat configured to limit access to a second cutting edge of the replaceable safety blade when the replaceable safety blade is secured within the safety utility knife assembly.

4. The safety utility knife assembly as in claim 3, wherein the first and second cutting edges define a single, continuous cutting edge.

5. The safety utility knife assembly as in claim 1, wherein the replaceable safety blade includes contiguous piece of metal that is selected from the group consisting of: carbon steel, heat treated metal, heat treated carbon steel and stainless steel.

6. The safety utility knife assembly as in claim 1, wherein a cutting edge of the replaceable safety blade has a triangular shaped cross section.

7. The safety utility knife assembly as in claim 1, wherein the blade retainer includes a first wedge and a second wedge.

8. A safety utility knife assembly, comprising:
   a handle having a blade retainer release button aperture;
   a blade retainer having an upwardly extending blade retainer release button extending outwardly and an upwardly extending blade retainer catch, wherein the blade retainer release button is received within the blade retainer release button aperture and accessible therefrom when the blade retainer is inserted into the handle; and
   a replaceable safety blade carried by the blade retainer and having a blade retainer securing aperture, wherein the replaceable safety blade is removable from the safety utility knife assembly when a user presses on the blade retainer release button to disengage the blade retainer catch from the blade retainer securing aperture for allowing removal of the blade from the blade retainer, wherein the blade retainer further comprises a longitudinally extending resilient arm having one fixed end and an opposing distal end, wherein the blade retainer catch is disposed at the distal end, wherein the blade retainer release button is disposed on the longitudinally extending resilient arm between the one fixed end and the opposing distal end, wherein the resilient arm flexes at the fixed end, and wherein the blade retainer catch moves in the same direction as the blade retainer release button to release the blade retainer and catch from the blade retainer securing aperture and allow the replaceable safety blade to be removed from the handle.

9. The safety utility knife assembly as in claim 8, further comprising a first blade throat configured to limit access to a first cutting edge of the replaceable safety blade when the replaceable safety blade is secured within the safety utility knife assembly.

10. The safety utility knife assembly as in claim 9, further comprising a second blade throat configured to limit access to a second cutting edge of the replaceable safety blade when the replaceable safety blade is secured within the safety utility knife assembly.

11. The safety utility knife assembly as in claim 10, wherein the first and second cutting edges define a single, continuous cutting edge.

12. The safety utility knife assembly as in claim 8, wherein the replaceable safety blade includes contiguous piece of metal that is selected from the group consisting of: carbon steel, heat treated metal, heat treated carbon steel and stainless steel.

13. The safety utility knife assembly as in claim 8, wherein a cutting edge of the replaceable safety blade has a triangular shaped cross section.

14. A method of manufacturing a safety utility knife assembly as in claim 8, the method comprising;
providing the handle having the blade retainer release button aperture and the blade retainer securing aperture;
providing the blade retainer having the blade retainer release button extending upwardly and the blade retainer catch, wherein the blade retainer release button is received within the blade retainer release button aperture and is accessible therefrom when the blade retainer is inserted into the handle;
providing a strip of blade material;
forming a rough blade shape from the strip of blade material;
forming a blade securing aperture in the rough blade shape;
forming a blade cutting edge in the rough blade shape to form the replaceable safety blade;
inserting the blade in the blade retainer; and
inserting the blade retainer into the handle such that the blade retainer catch is received within the blade retainer securing aperture.

15. The method as in claim 14, wherein the blade inserting step having the blade cutting edge oriented perpendicular to a longitudinally extending axis of the handle.

16. The method as in claim 14, further comprising selecting the strip of blade material from the group consisting of: carbon steel, heat treated metal, heat treated carbon steel, stainless steel and ceramic.

17. The method as in claim 14, further comprising forming the blade cutting edge to have a triangular shaped cross section.

18. The method as in claim 14, further comprising having the blade retainer securing aperture centered with respect to opposing ends of the replaceable safety blade.

19. The method as in claim 14, further comprising having each end of the safety utility blade to include at least a portion extending perpendicular to the cutting edge.

20. The method as in claim 14, further comprising having each end of the safety utility blade to include at least a portion extending at an angle with respect to the cutting edge.

* * * * *